(12) United States Patent
Fukada

(10) Patent No.: US 8,533,209 B2
(45) Date of Patent: Sep. 10, 2013

(54) SEARCH APPARATUS, CONTROL METHOD FOR SEARCH APPARATUS, AND PROGRAM

(75) Inventor: Masanori Fukada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 291 days.

(21) Appl. No.: 12/824,040

(22) Filed: Jun. 25, 2010

(65) Prior Publication Data

US 2011/0016140 A1 Jan. 20, 2011

(30) Foreign Application Priority Data

Jul. 17, 2009 (JP) .................................. 2009-169574
Apr. 8, 2010 (JP) .................................. 2010-089856

(51) Int. Cl.
*G06F 7/00* (2006.01)
*G06F 17/30* (2006.01)

(52) U.S. Cl.
USPC ......................................................... 707/756

(58) Field of Classification Search
None
See application file for complete search history.

(56) References Cited

U.S. PATENT DOCUMENTS

| 5,689,631 | A | * | 11/1997 | Chenoweth | ...................... | 714/11 |
| 6,810,404 | B1 | * | 10/2004 | Ferguson et al. | ...................... | 1/1 |
| 2009/0198703 | A1 | * | 8/2009 | Ezzat et al. | ...................... | 707/10 |
| 2010/0198852 | A1 | * | 8/2010 | Tago | ............................. | 707/758 |
| 2010/0228754 | A1 | * | 9/2010 | Shimakura | ..................... | 707/758 |
| 2010/0284680 | A1 | * | 11/2010 | Higaki | .......................... | 396/310 |
| 2011/0208775 | A1 | * | 8/2011 | Brette et al. | .................. | 707/769 |

FOREIGN PATENT DOCUMENTS

JP 10171771 A 6/1998

* cited by examiner

*Primary Examiner* — Cheryl Lewis
*Assistant Examiner* — Raheem Hoffler
(74) *Attorney, Agent, or Firm* — Fitzpatrick, Cella, Harper & Scinto

(57) ABSTRACT

Provided are a dividing unit for dividing a search job into a first division job for performing search processing on an internal memory table and a second division job for performing search processing on an external memory table, a searching unit for executing the search processing of the first division job and the search processing of the second division job, that were obtained by the dividing performed by the dividing unit, in concurrent, and a terminating unit for, in accordance with a designated search mode, if searching in one of the first division job and the second division job terminates, terminating searching in the other of the division jobs.

6 Claims, 20 Drawing Sheets

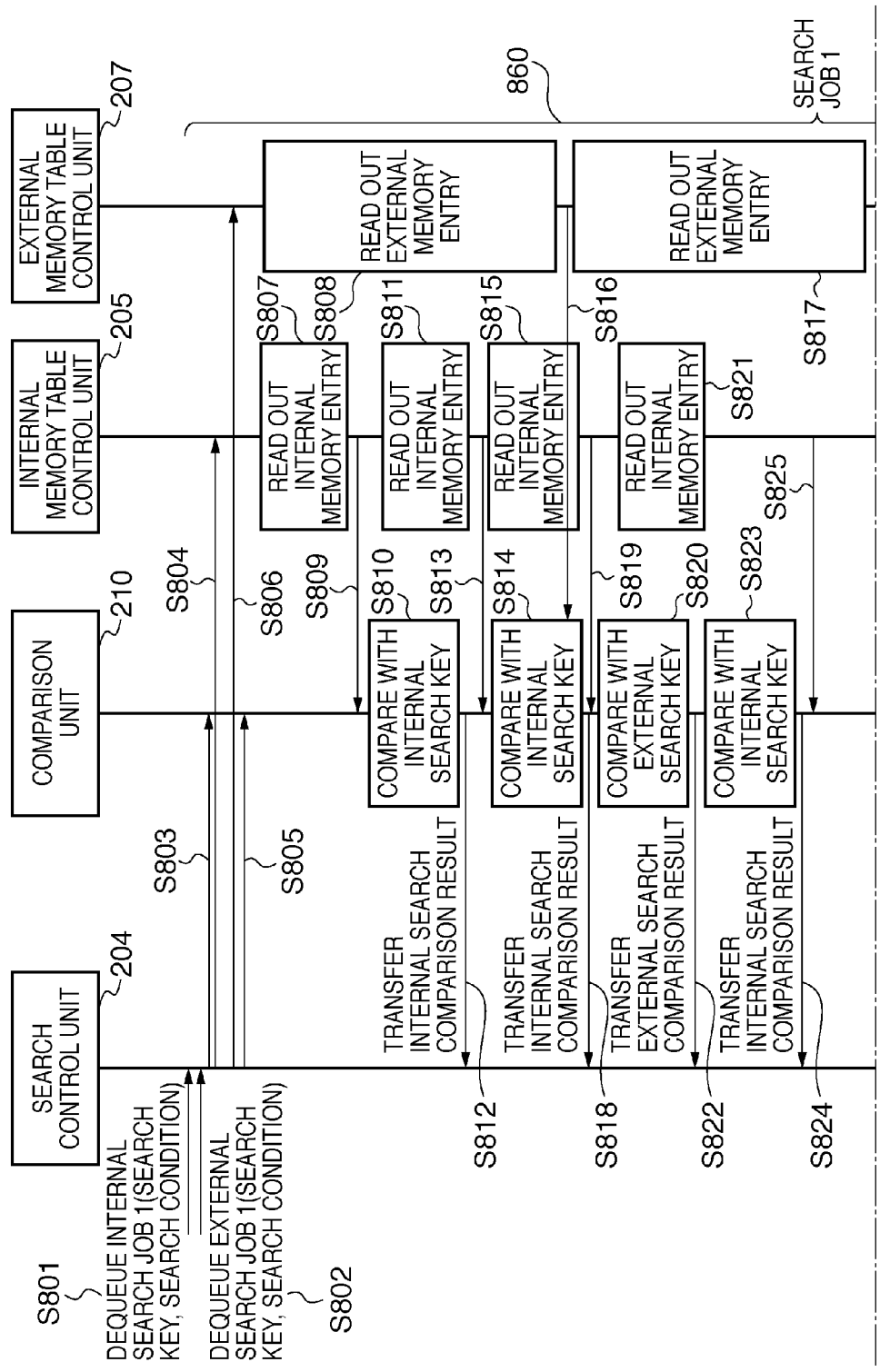

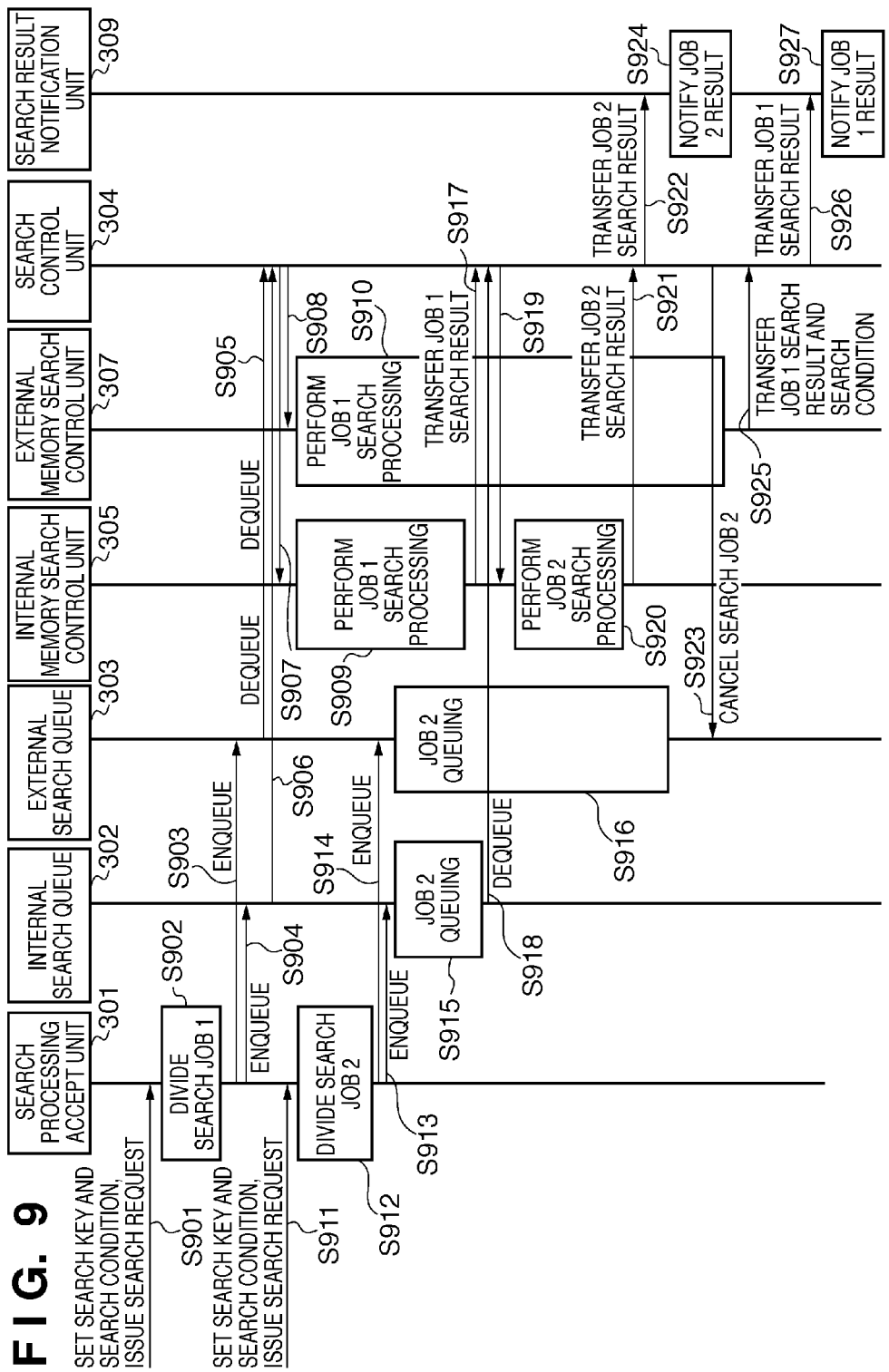

SEARCH APPARATUS, CONTROL METHOD FOR SEARCH APPARATUS, AND PROGRAM

BACKGROUND OF THE INVENTION

1. Field of the Invention

The present invention relates to a search apparatus, a control method for the search apparatus, and a program.

2. Description of the Related Art

In recent years, there has been demand for the ability to execute network protocol processing at high speed in not only general-purpose PCs, but also embedded equipment. Achieving a sufficient speed for gigabit Ethernet in protocol processing by software requires far more performance than that of processors mounted in embedded equipment.

In view of this, it has become common to realize broadband network communication by adding an auxiliary device known as a TOE (TCP/IP Offload Engine) that is specified for protocol processing. In TCP/IP protocol processing, socket searching and listen state searching are performed in TCP processing. Also, SPD (Security Policy Database) searching and SAD (Security Association Database) searching are performed in IPsec processing. Furthermore, reassemble searching and the like are also performed in IP processing, and it is necessary to perform searching for various purposes. Among such searching, in order to increase the speed of transmission processing and reception processing in the case of TCP/IP, there is a technique in which the speed of search processing in protocol processing is increased with use of CAM (Content Addressable Memory). However, since associative memory that employs CAM is expensive, associative memory that uses RAM and adopts a method of sequential comparison result outputting is used instead. In search processing that employs a search apparatus, a corresponding address is acquired from the search apparatus with use of a search key, and data is read out and written using the acquired address.

Furthermore, in order to increase the speed of transmission processing and reception processing in the case of TCP/IP, there is a technique in which protocol processing is pipelined or parallelized using a plurality of processors. Here, consider the case in which a search apparatus is shared among these processors. In the case in which two or more processors performing search processing access the search apparatus at the same time, if one of the processors performs data rewriting while another processor is performing search processing, the data rewriting will interfere with the search. For this reason, exclusion control needs to be performed, and there is the problem that one processor monopolizes the search apparatus for a long time.

To address this problem, a technique is adopted in which instead of directly accessing data, the processors input a command to a search processing accept unit, and when processing is completed, the result is returned using a search result display. Also, Japanese Patent Laid-open No. 10-171771 proposes a technique in which a queue format is adopted to enable the sharing of a search apparatus among a plurality of processors.

In order to respond to increases in network scale, it is necessary to increase the maximum number of entries for sockets, SPs (Security Policy), SAs (Security Association), and the like that can be registered. However, the capacity of the associative memory needs to be increased in proportion to the increase in the maximum number of entries that can be registered, thus raising the implementation cost. In view of this, search processing is performed in which part of a search table is stored in an external memory such as a DRAM, and a search table stored in an on-chip internal memory such as an SRAM and a search table stored in the external memory logically configure one search table. In this way, a technique is conceivable in which the number of entries to be search target data pieces that can be registered is increased while suppressing a rise in the memory implementation cost.

The method disclosed in Japanese Patent Laid-open No. 10-171771 has no effect with respect to a reduction in the performance of search processing executed one job at a time, since each search job is processed after the previous search job has been completed. Specifically, in a search apparatus, if a search table is configured using both a high-speed internal memory and a low-speed external memory, searching the external memory will take a longer time, thus leading to the issue of a reduction in the performance of search processing executed one job at a time. Also, in the case in which the search apparatus is shared among a plurality of processors, a search job whose processing requires a longer time will delay the processing of other search jobs, and the search apparatus will be monopolized for a longer time, thus leading to the issue of the inability to efficiently process search requests. Furthermore, searches performed in protocol processing include searching in which it is only necessary to find one entry among the search targets. In the case in which a search table is configured using both a high-speed internal memory and a low-speed external memory, processing will take a longer time if an entry registered in the external memory is found. With consecutive packet searching in protocol processing, the case where the same entry is repeatedly a search hit occurs statistically often, and the issue of inefficiency arises if that entry is an entry registered in the external memory.

SUMMARY OF THE INVENTION

In light of the aforementioned issues, the present invention provides a search apparatus that prevents a reduction in the performance of search processing executed one job at a time, which occurs when a search table is configured using both a high-speed internal memory and a low-speed external memory. Also, the present invention provides a search apparatus that, in the case of being shared among a plurality of processors, efficiently processes consecutive search requests by shortening the delay time imposed on the processing of a search job by another search job whose processing takes a longer time. Furthermore, the present invention provides a search apparatus that maximizes search processing performance by relocating an entry in a search table when an entry in the internal memory has been deleted, so as to prioritize use of the high-speed internal memory over the low-speed external memory. Moreover, the present invention provides a search apparatus that, in the case in which the search mode is a mode in which searching is terminated if even one entry data piece registered in the internal memory table or the external memory table matches a search key, replaces an arbitrary internal memory entry with an entry that is a search hit in the external memory table, thus efficiently processing consecutive packet search requests.

According to one aspect of the present invention, there is provided a search apparatus comprising, a dividing unit adapted to divide a search job into a first division job for performing search processing on an internal memory table and a second division job for performing search processing on an external memory table; a searching unit adapted to execute the search processing of the first division job and the search processing of the second division job, that were obtained by the dividing performed by the dividing unit, in concurrent; and a terminating unit adapted to, in accordance with a designated search mode, if searching in one of the first division job and the second division job terminates, terminate searching in the other of the division jobs.

According to the present invention, in a search apparatus, it is possible to prevent a reduction in the performance of search processing executed one job at a time, which occurs when a search table is configured using both a high-speed internal memory and a low-speed external memory. Also, in the case in which the search apparatus is shared among a plurality of processors, it is possible to partially shorten the delay time imposed on the processing of a search job by another search job whose processing takes a longer time, and efficiently process consecutive search requests. Furthermore, it is possible to maximize search processing performance by prioritizing use of the high-speed internal memory over the low-speed external memory. Moreover, it is possible to shorten the delay time imposed in the case in which an entry registered in the external memory is the target entry of consecutive packet searches, thus enabling efficient processing of consecutive packet search requests.

Further features of the present invention will become apparent from the following description of exemplary embodiments with reference to the attached drawings.

BRIEF DESCRIPTION OF THE DRAWINGS

FIGS. 8A and 8B are diagrams illustrating a processing sequence performed in a common search unit according to Embodiment 1.

FIG. 9 is a diagram illustrating a processing sequence performed in the search apparatus according to Embodiment 2.

DESCRIPTION OF THE EMBODIMENTS

Embodiment 1

Below is a description of an exemplary configuration of a communication apparatus including a TOE sub system 105 according to Embodiment 1.

Figure 1:
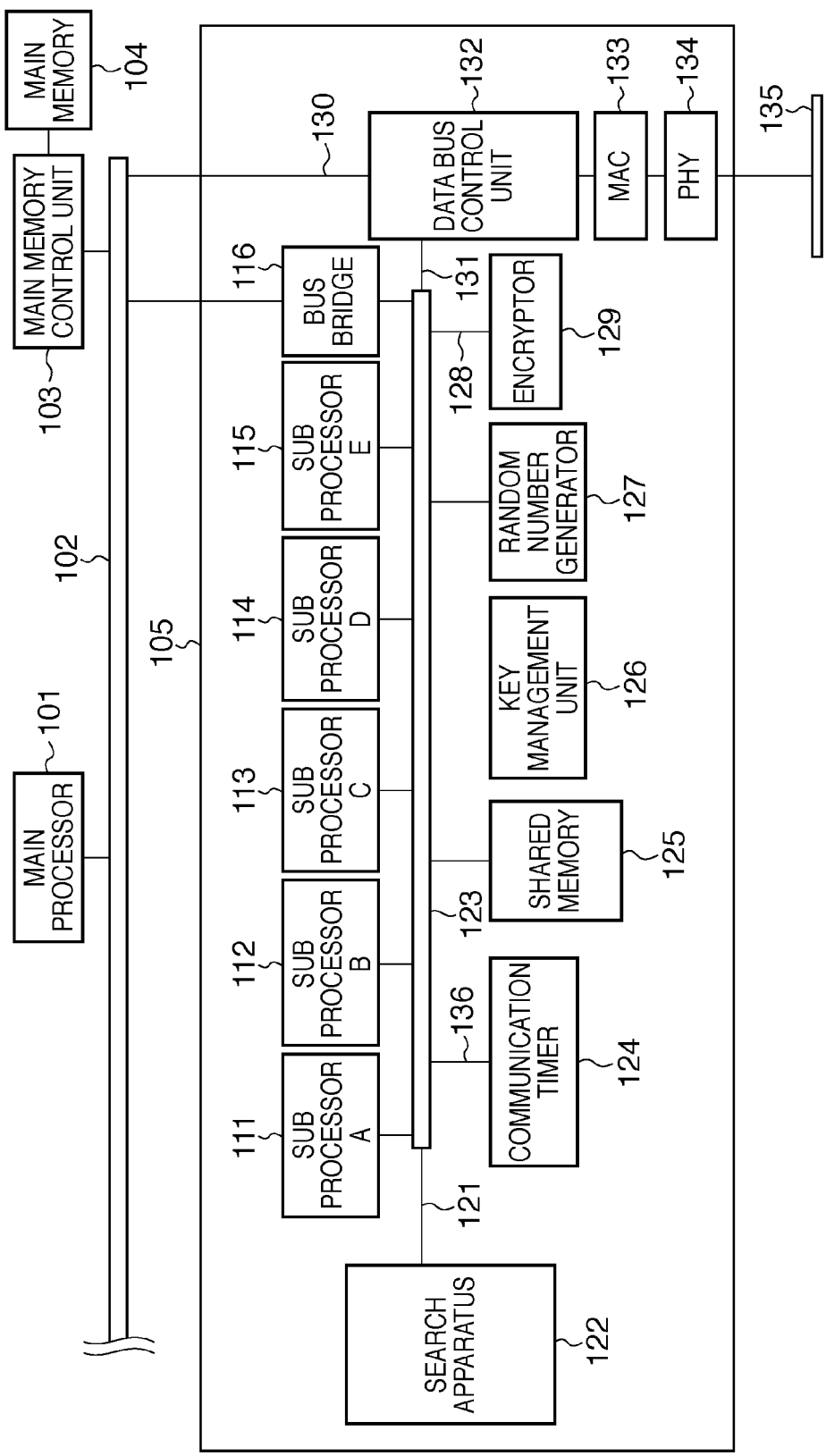
FIG. 1 is a diagram showing a configuration of a TOE sub system according to Embodiments 1 and 2.
Figure 4:
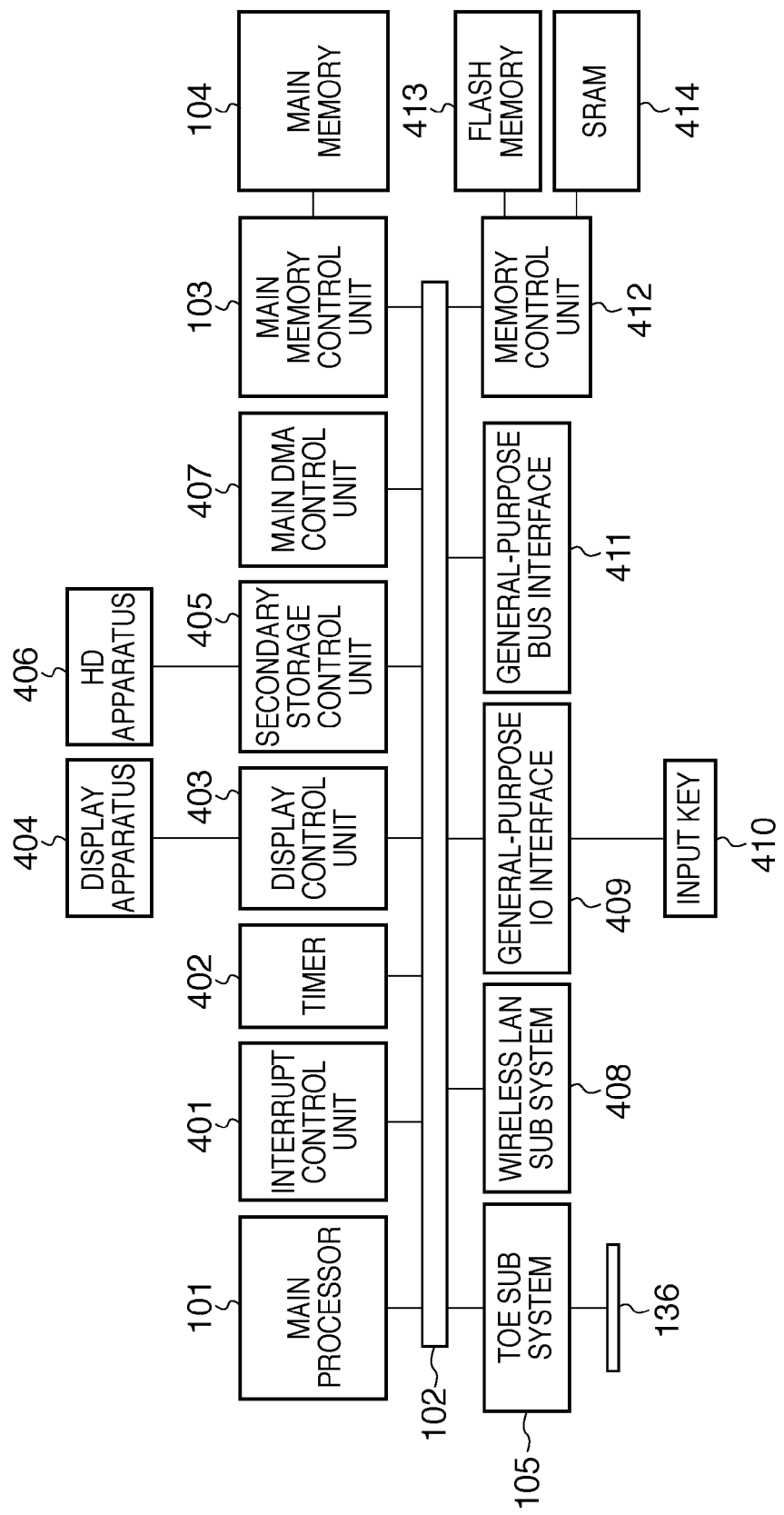
FIG. 4 is a diagram showing a survey view of a communication apparatus according to Embodiments 1 and 2.

A system bus 102 in FIGS. 1 and 4 is an on-chip bus having a crossbar switch structure typified by the AMBA 3.0 AXI (Advanced eXtensible Interface) proposed by ARM Ltd. The system bus 102 enables the concurrent transfer of transmission/reception data, which is required of the communication apparatus. The TOE sub system 105 according to Embodiment 1 is connected to the system bus 102 of the communication apparatus.

The communication apparatus is connected to an Ethernet 135 via a PHY (physical layer chip) 134 included in the TOE sub system 105 (see FIG. 1). An HD (Hard Disk) apparatus 406 is connected to the system bus 102 via a secondary storage control unit 405 (see FIG. 4). The HD apparatus 406 stores software that realizes the functionality of the communication apparatus and data related thereto, and firmware that runs on sub processors in sub systems and data related thereto. Furthermore, the HD apparatus 406 stores history information such as an operation history and a communication history of the communication apparatus. The software includes application software that realizes the functions of the communication apparatus, application protocols, device drivers for controlling related hardware, and an OS (Operating System).

A Flash memory 413 is connected to the system bus 102 via a memory control unit 412. The Flash memory 413 is a rewritable non-volatile memory. The Flash memory 413 stores a boot program that runs at the time of startup of the communication apparatus, and parameters necessary for initial state setting of the communication apparatus. Furthermore, the Flash memory 413 stores device driver programs for controlling hardware at the time of startup of the communication apparatus, setting parameters used at the time of startup of the hardware, and the like.

A main processor 101 of the communication apparatus, which is a computer, executes the boot program in the Flash memory 413. Furthermore, the main processor 101 initializes the hardware and sub systems of the communication apparatus, and thereafter loads the software stored in the HD apparatus 406 into a main memory 104, and starts up the OS included in the software. Also, at the time of initialization of the sub systems, the main processor 101 expands, to the main memory 104, firmware executed by five sub processors A to E (111 to 115) included in the TOE sub system 105, and starts up the sub processors. The sub processors (111 to 115) load the firmware expanded to the main memory 104 into an instruction cache included in each sub processor, and execute the firmware programs.

An interrupt control unit 401 that transfers interrupt events from the hardware and the TOE sub system 105 to the main processor 101 is connected to the system bus 102 of the communication apparatus. Also, the communication apparatus includes a timer 402 that is started up by software or the like, measures time, and generates a timeout event. Furthermore, the communication apparatus includes an input key 410 that is for inputting an operating mode setting of the communication apparatus, and communication parameters typified by IP (Internet Protocol) addresses. Moreover, the communication apparatus includes a display apparatus 404 that displays the state of the application communication apparatus, setting content, and the like, and a wireless LAN sub system 408 that is for connecting to a wireless LAN compliant with any of the IEEE 802.11a/b/g/n standards.

The TOE sub system 105 internally includes a sub system bus 123 and is connected to the system bus 102 via a bus bridge 116 (see FIG. 1). This sub system bus 123 is a crossbar switch connection. The five sub processors (111 to 115) included in the TOE sub system 105 are connected to the sub system bus 123. Through multi-processor processing performed by these sub processors, TCP/IP protocol processing is offloaded from the main system and executed at high speed.

Also, the TOE sub system 105 includes a communication unit that performs communication between the five sub processors A to E (111 to 115), a shared memory 125 for the sharing of information, and a communication timer 124 that performs timeout event generation and time measurement necessary for TCP/IP protocol processing. Furthermore, the TOE sub system 105 includes the PHY 134 and a MAC (Media Access Control) 133 for connecting to the Ethernet 135. The PHY 134 is hardware that handles electrical signals and protocol processing in a PHY (physical) layer 507, which is positioned as the first layer in the OSI Reference Model. The MAC 133 is hardware that processors protocols in a MAC layer 506, which corresponds to a lower sublayer of the data link layer (second layer) in the OSI Reference Model.

The TOE sub system 105 includes a data bus control unit 132 that has a DMA transfer function for transferring reception packet data and transmission packet data between the MAC 133 and a memory device, which is the main memory 104 or the shared memory 125, for example. The data bus control unit 132 performs checksum calculations for packet data during transfer processing. Furthermore, the TOE sub system 105 includes a search apparatus 122 having an associative memory that performs search processing and the storage of various types of management information in protocol processing.

The TOE sub system 105 executes encrypted communication protocol processing. Examples of encrypted communication protocols include IPsec (Security Architecture for Internet Protocol). The TOE sub system 105 also executes encrypted communication protocol processing such as SSL (Secure Socket Layer) and TLS (Transport Layer Security). For this reason, the TOE sub system 105 includes a key managing unit 126, a random number generator 127, and an encryptor 129. The key managing unit 126 holds an encryption key generated for encrypted communication protocol processing, a random number, and a prime number in a secure manner. The random number generator 127 generates a random value that is necessary for encryption processing. Also, the encryptor 129 included in the TOE sub system 105 includes an AES (Advanced Encryption Standard) encryptor that has been selected by the National Institute of Standards and Technology (NIST). Furthermore, the encryptor 129 includes an SHA-1 (Secure Hash Algorithm 1) hash function unit used for authentication, digital signatures, and the like. Moreover, the encryptor 129 includes, for example, an MD5 (Message Digest 5) hash function unit standardized by the IETF in RFC1321.

Figure 5:
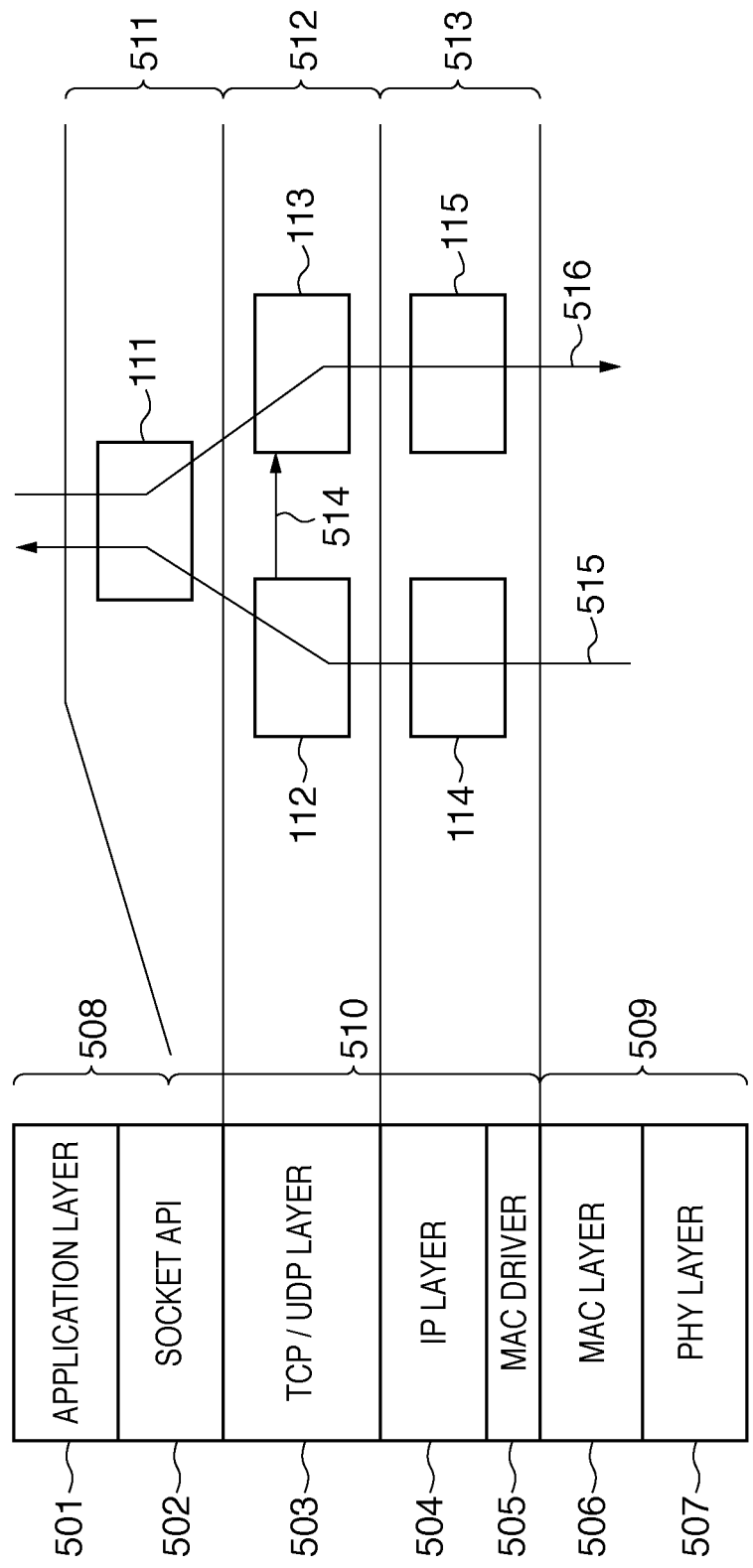
FIG. 5 is a diagram showing the roles of sub processors and the relationship between protocol processing pipeline stages according to Embodiments 1 and 2.

The following describes the roles of the sub processors A to E (111 to 115) of the TOE sub system 105 with reference FIG. 5. In FIG. 5, 501 to 507 denote TCP/IP protocol processing in a hierarchical structure. FIG. 5 shows an application layer 501, a socket API 502, a transport layer (TCP/UDP layer) 503, an Internet layer (IP layer) 504, a MAC driver 505, a MAC layer 506, and a PHY layer 507. The processing functionality of the TOE sub system 105 covers the range of a layer 510. Specifically, the processing functionality of the TOE sub system 105 includes the processing functions of the IP layer 504 for processing the IP protocol, and the processing functions of the TCP/UDP layer 503 for processing the TCP protocol and the UDP protocol. Furthermore, the functions of the MAC driver 505 for exchanging communication data and communication information with the MAC layer 506 are included. Moreover, part of the functions of the socket API 502, which is an application communication API, is included.

In the processing of the above functionality, the functions are divided among the sub processors. For example, the processing of the socket API 502 portion is allocated to the sub processor A 111, and among the processing of the TCP protocol and the UDP protocol, the processing related to reception operations is allocated to the sub processor B 112, and the processing related to transmission operations is allocated to the sub processor C 113. Among the processing of the MAC driver 505 and the IP protocol, the processing related to reception operations is allocated to the sub processor D 114, and the processing related to transmission operations is allocated to the sub processor E 115. The intent of dividing the processing in this way is to divide a series of protocol processing into three pipeline stages (511 to 513), and perform pipeline operations. Also, dividing transmission operations and reception operations enables the sub processors in charge of such functions to operate in parallel.

In the present embodiment, the transfer of processing data and sharing of control information between the sub processors is performed via the shared memory 125. For example, from the viewpoint of guaranteeing the arrival of transfer data with the TCP protocol, arrival confirmation information called a confirmation response is transferred between connection points, from the data reception side to the transmission side. Performing this confirmation response processing needs a transfer 514 of a confirmation response between the sub processor B 112 and the sub processor C 113 (see FIG. 5). This transfer of control information in TCP communication is performed via the shared memory 125. The transfer of arrival confirmation information and the sharing of control information between the sub processors may be performed using the main memory 104.

Figure 2:
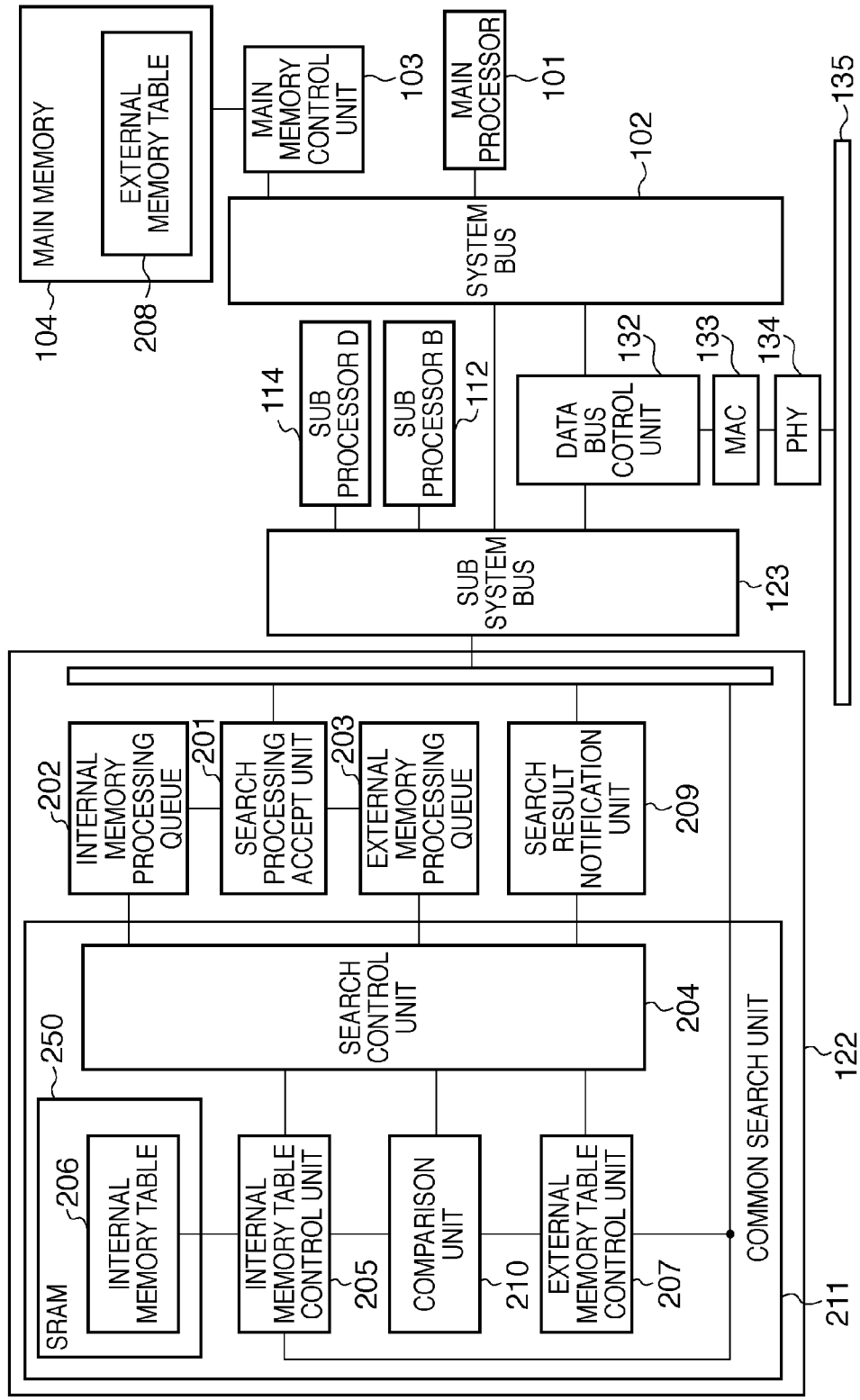
FIG. 2 is a diagram illustrating a configuration of a search apparatus according to Embodiment 1.

The following describes an exemplary configuration of the search apparatus 122 included in the TOE sub system 105. As shown in FIG. 2, the search apparatus 122, which executes data search processing through readout processing and comparison processing, is connected to the sub system bus 123 of the TOE sub system 105. The search apparatus 122 executes search processing in protocol processing upon receiving a request from the sub processors, and transmits the search result back to the sub processors. In such a case, a sub processor sets parameters regarding a search key, a search mode, and the like, and issues a search processing request. One of the search modes is a single-hit mode in which search processing is terminated if even one of the entry data pieces registered in the search table matches the search key. Another search mode is an all-search mode in which search processing is terminated after comparing the search key and all the entry data pieces registered in the search table. In the all-search mode, there is the possibility of finding a plurality of entry data pieces.

Also, the search apparatus 122 performs processing for registering entry data in the search table as well as deletion processing upon receiving a request from a sub processor. The search apparatus 122 includes a search processing accept unit 201 that accepts search processing, processing for registering entry data in memory included in the search apparatus and external memory referenced by the search apparatus, and deletion processing.

Also, the search processing accept unit 201 divides a search job into an internal memory processing job (first divided job) and an external memory processing job (second divided job). In the system shown in FIG. 1, the external memory corresponds to the main memory 104. The search apparatus 122 also includes an internal memory processing queue 202 as a first queuing unit that queues the internal memory processing job. The search apparatus 122 also includes an external memory processing queue 203 as a second queuing unit that queues the external memory processing job (see FIG. 2). The search apparatus 122 also includes a common search unit 211 that executes processing from the jobs queued in these two queues. The search apparatus 122 also includes a search result notification unit 209 that notifies the result of the processing performed by the common search unit 211 to the sub processor that issued the search processing request.

The common search unit 211 includes a search control unit 204 that analyzes the internal memory processing job and the external memory processing job, and controls search processing, registration processing, and deletion processing. Also, the common search unit 211 includes an internal memory table 206 as a first storing unit that stores entries targeted for searching, and an internal memory table control unit 205 that controls the internal memory table 206. An SRAM 250 or the like is used as the internal memory. The common search unit 211 also includes an external memory table 208 as a second storing unit that stores entries targeted for searching, and an external memory table control unit 207 that controls the external memory table 208. The common search unit 211 also includes a comparison unit 210 that performs comparison processing on the search key and entry data that has been read out by the internal memory table control unit 205 and the external memory table control unit 207. Note that the internal memory table 206 may be controlled using the shared memory 125 included in the TOE sub system 105.

Figure 10:
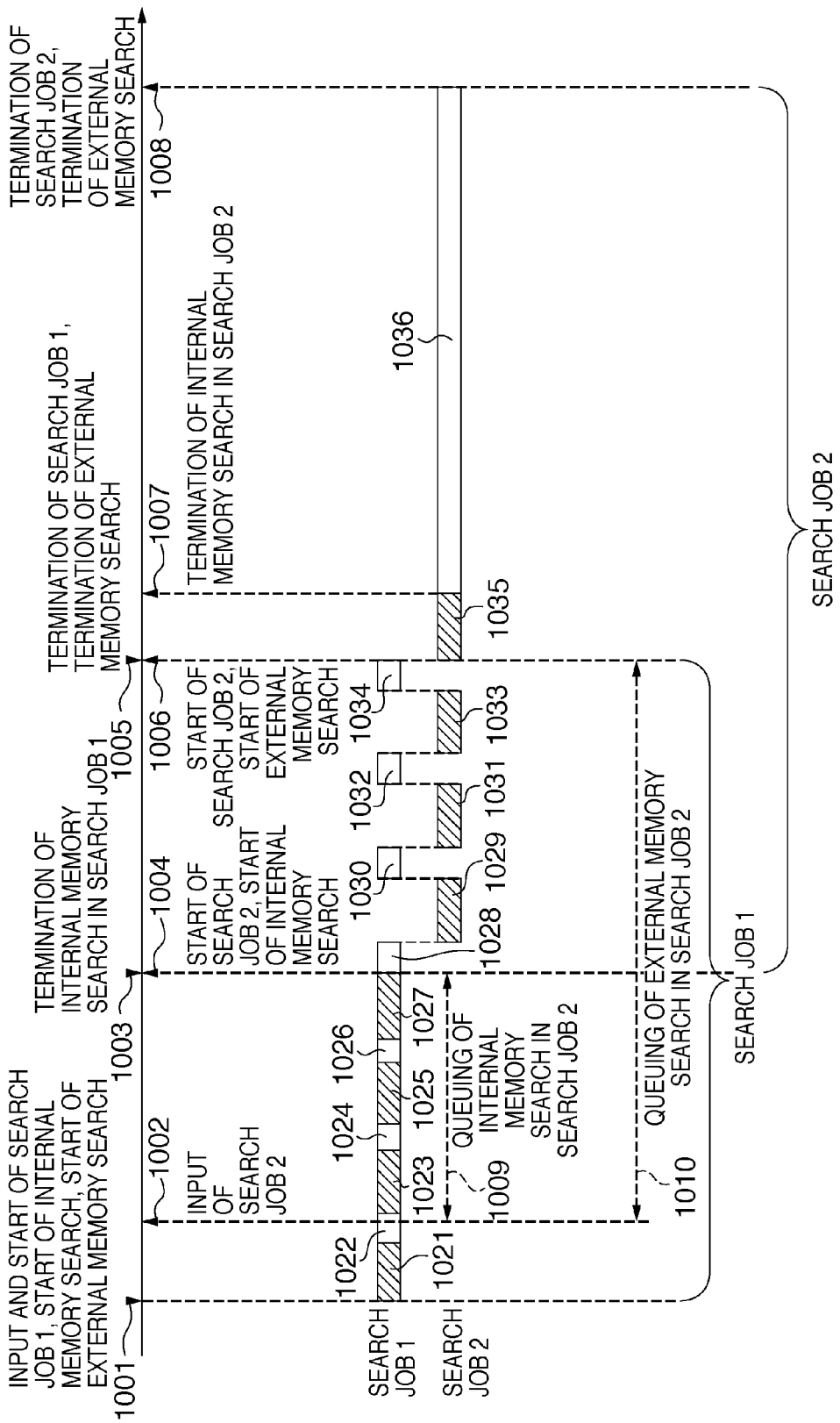
FIG. 10 is a diagram showing timings of the start, termination, and the like of search jobs (all-search mode) according to Embodiment 1.

The following describes timings in the search processing performed by the common search unit 211. Below is a description of a case in which requests have been issued for a search job 1 and a search job 2 to both be processed in the all-search mode, with reference to FIG. 10.

At a time 1001, a search processing request is issued, and the search job 1 is input. The search job 1 starts immediately after the input of the search job 1, and then search processing in an internal memory search job 1 and an external memory search job 1, into which the search job 1 was divided, starts. The search processing is executed by performing processing for reading out entry data and processing for comparing the read out entry data and a pre-set search key. In the comparison processing in the internal memory search job 1 and the external memory search job 1, readout processing and comparison processing are switched by the common search unit 211 in units (bursts) of readout from the external memory. The external memory readout processing is performed while the internal memory search processing is being performed, and when a certain unit of the external memory readout processing terminates, the search key and the entry data read out from the external memory are compared. This unit of readout is desirably the same size as the entry size of data targeted for searching. If the entry size and the readout unit size are different, the comparison of the pre-set search key and the read out entry data needs to be performed in parts during comparison processing performed in the comparison unit 210.

At a time 1002, the next search processing request is issued, and the search job 2 is input. At this time, the internal memory table control unit 205 and the external memory table control unit 207 are both performing search processing. For this reason, an internal memory search job 2 and an external memory search job 2, into which the search job 2 was divided, are enqueued in the internal memory processing queue 202 and the external memory processing queue 203 respectively. The internal memory search job 2 is queued in the internal memory processing queue 202 throughout a period 1009 that ends when the internal memory table control unit 205 finishes the search processing of the internal memory search job 1 and the internal memory search job 2 is dequeued as the next internal memory search job. Likewise, the external memory search job 2 is queued in the external memory processing queue 203 throughout a period 1010 that ends when the external memory table control unit 207 finishes the processing of the external memory search job 1 and the external memory search job 2 is dequeued as the next external memory search job.

At a time 1003, the comparison of the search key and all the entry data pieces in the internal memory table 206 of the search job 1 is completed, the internal memory search job 1 terminates, and immediately at a time 1004, the internal memory search job 2 is dequeued, and the search processing thereof starts. At a time 1005, the comparison of the search key and all the entry data pieces in the external memory table 208 of the search job 1 is completed, the external memory search job 1 is completed, and therefore the search job 1 is completed. The search result notification unit 209 notifies the search result to the sub processor that issued the search processing request. Between the time 1004 and the time 1005, processing is executed while switching between the external memory search job 1 pertaining to the search job 1 and the internal memory search job 2 pertaining to the search job 2 at a certain time interval.

At a time 1006, the comparison of the search key and all the entry data pieces in the external memory table 208 in the search job 1 started at the time 1005 is completed and the external memory search job 1 terminates, and immediately the external memory search job 2 is dequeued and the search processing thereof starts. At a time 1007, the processing for comparing the search key and all the entry data pieces in the internal memory table 206 of the search job 2 is completed, and the internal memory search job 2 terminates. At this time, since the next internal memory search job is not queued, the internal memory table control unit 205 waits until the next internal memory search job is input.

At a time 1008, the comparison of the search key and all the entry data pieces in the external memory table 208 of the search job 2 is completed, and the external memory search job 2 terminates. The search job 2 is completed, and the search result notification unit 209 notifies the search result to the sub processor that issued the search processing request. Between the time 1007 and the time 1008, internal memory search processing is not being performed, and therefore only external memory search processing is performed.

The period between the time 1001 and the time 1005 is when the search job 1 is being executed, and the period between the time 1004 and the time 1008 is when the search job 2 is being executed.

Intervals 1021, 1023, 1025, and 1027 are periods during which the internal memory search processing and external memory readout processing in the search job 1 are being performed. Intervals 1022, 1024, and 1026 are periods during which internal memory readout processing and processing for comparing the search key and entry data read out from the external memory in the search job 1 are being performed. Intervals 1028, 1030, 1032, and 1034 are periods during which processing for comparing the search key and entry data read out from the external memory in the search job 1 and internal memory readout processing in the search job 2 are being performed. Intervals 1029, 1031, and 1033 are periods during which external memory readout processing in the search job 1 and internal memory search processing in the search job 2 are being performed. An interval 1035 is a period during which internal memory search processing and external memory readout processing in the search job 2 are being performed. An interval 1036 is a period during which external memory search processing in the search job 2 is being performed. In this way, external memory readout processing is executed in parallel while internal memory search processing is being performed. Also, search processing can be performed efficiently since in the comparison processing performed by the comparison unit 210, readout processing and comparison processing are executed in concurrent by being switched by the common search unit 211 according to a certain unit.

Figure 11:
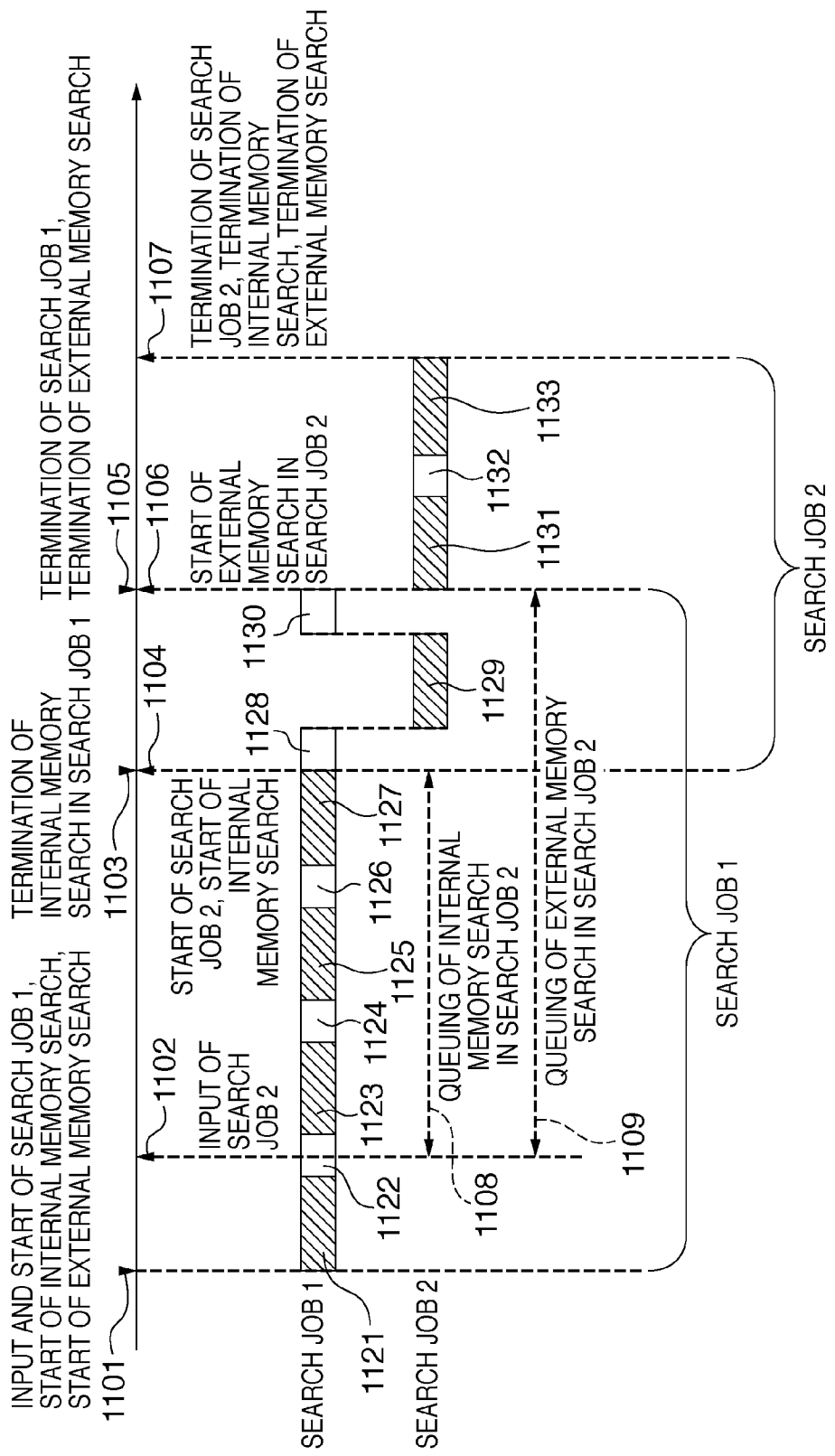
FIG. 11 is a diagram showing timings of the start, termination, and the like of search jobs (single-hit mode) according to Embodiment 1.

Below is a description of a case in which requests have been issued for the search job 1 and the search job 2 to both be processed in the single-hit search mode, with reference to FIG. 11. At a time 1101, a search processing request is issued, and the search job 1 is input. Immediately after the input of the search job 1, the search job 1 is started, and search processing of the internal memory search job 1 and the external memory search job 1, into which the search job 1 was divided, is started. Comparison processing in the internal memory search job 1 and the external memory search job 1 is executed while performing switching in units (bursts) of readout from the external memory. The external memory readout processing is performed while the internal memory search processing is being performed, and when a certain unit of the external memory readout processing terminates, processing for comparing the search key and the entry data read out from the external memory is performed.

At a time 1102, the next search processing request is issued, and the search job 2 is input. At this time, the internal memory table control unit 205 and the external memory table control unit 207 are respectively performing processing of the internal memory search job 1 and the external memory search job 1, into which the search job 1 was divided. For this reason, the internal memory search job 2 and the external memory search job 2, into which the search job 2 was divided, are respectively enqueued in the internal memory processing queue 202 and the external memory processing queue 203. The internal memory search job 2 is queued in the internal memory processing queue 202 throughout a period 1108 that ends when the internal memory table control unit 205 finishes the processing of the internal memory search job 1 and the internal memory search job 2 is dequeued as the next internal memory search job. Likewise, the external memory search job 2 is queued in the external memory processing queue 203 throughout a period 1109 that ends when the external memory table control unit 207 finishes the search processing of the external memory search job 1 and the external memory search job 2 is dequeued as the next external memory search job.

At a time 1103, the internal memory search job 1 terminates without any hits (matches) even though processing for comparing the search key and all the entry data pieces in the internal memory table 206 was executed. Then, immediately at time 1004, the internal memory search job 2 is dequeued, and the next search processing starts. At a time 1105, the result of the processing for comparing the search key and the entry data in the external memory table 208 is that a search hit (match) exists, the external memory search job 1 terminates, and the search job 1 is completed. Then, the search result notification unit 209 notifies the search result to the sub processor that issued the search processing request. Between the time 1104 and the time 1105, processing is executed while switching between the external memory search of the search job 1 and the internal memory search of the search job 2.

At a time 1106, the external memory search job 1 performed at time 1105 terminates, and immediately the external memory search job 2 is dequeued, and the search processing thereof starts. At a time 1107, the result of the processing for comparing the search key and all the entry data pieces in the internal memory table 206 is that a search hit (match) exists, the internal memory search processing of the search job 2 terminates, and the search job 2 is completed. The search result notification unit 209 notifies the search result to the sub processor that issued the search processing request. Also, the external memory search job 2 is queued in the external memory processing queue 203, and the start of search processing is waited for. Accordingly, the search control unit 204 cancels the external memory search job 2 from the external memory processing queue 203. At this time, since neither a next internal memory search job nor external memory processing job are queued, the input of the next search job is waited for. The period between the time 1101 and the time 1105 is when the search job 1 is being executed, and the period between the time 1104 and the time 1107 is when the search job 2 is being executed.

Intervals 1121, 1123, 1125, and 1127 are periods during which the internal memory search processing in the search job 1 and the external memory readout processing in the search job 1 are being performed. Intervals 1122, 1124, and 1126 are periods during which processing for comparing the search key and entry data read out from the external memory in the search job 1 and the internal memory readout processing in the search job 1 are being performed. Intervals 1128 and 1130 are periods during which processing for comparing the search key and entry data read out from the external memory in the search job 1 and the internal memory readout processing in the search job 2 are being performed. An interval 1129 is a period during which the external memory readout processing in the search job 1 and the internal memory search processing in the search job 2 are being performed. Intervals 1131 and 1133 are periods during which the external memory readout processing in the search job 2 and the internal memory search processing in the search job 2 are being performed. An interval 1132 is a period during which processing for comparing the search key and entry data read out from the external memory in the search job 2 and the internal memory readout processing in the search job 2 are being performed.

In this way, search processing can be performed efficiently since external memory readout processing is performed in parallel while internal memory search processing is being performed, and the comparison processing performed by the comparison unit 210 is performed in concurrent while switching processing according to a certain unit. Also, since a search job is terminated when an entry data piece is found according to the single-hit mode, it is anticipated that the search processing will finish sooner.

The following describes a flow of the search processing performed by the search apparatus 122. In step S1401 in FIG. 14, the search processing accept unit 201 accepts a processing request due to a processing request having been written to a register by one of the sub processors. The search processing accept unit 201 analyzes the processing request, divides the search job into an internal memory search job and an external memory search job, and enqueues them in the internal memory processing queue 202 and the external memory processing queue 203 respectively.

Figure 15:
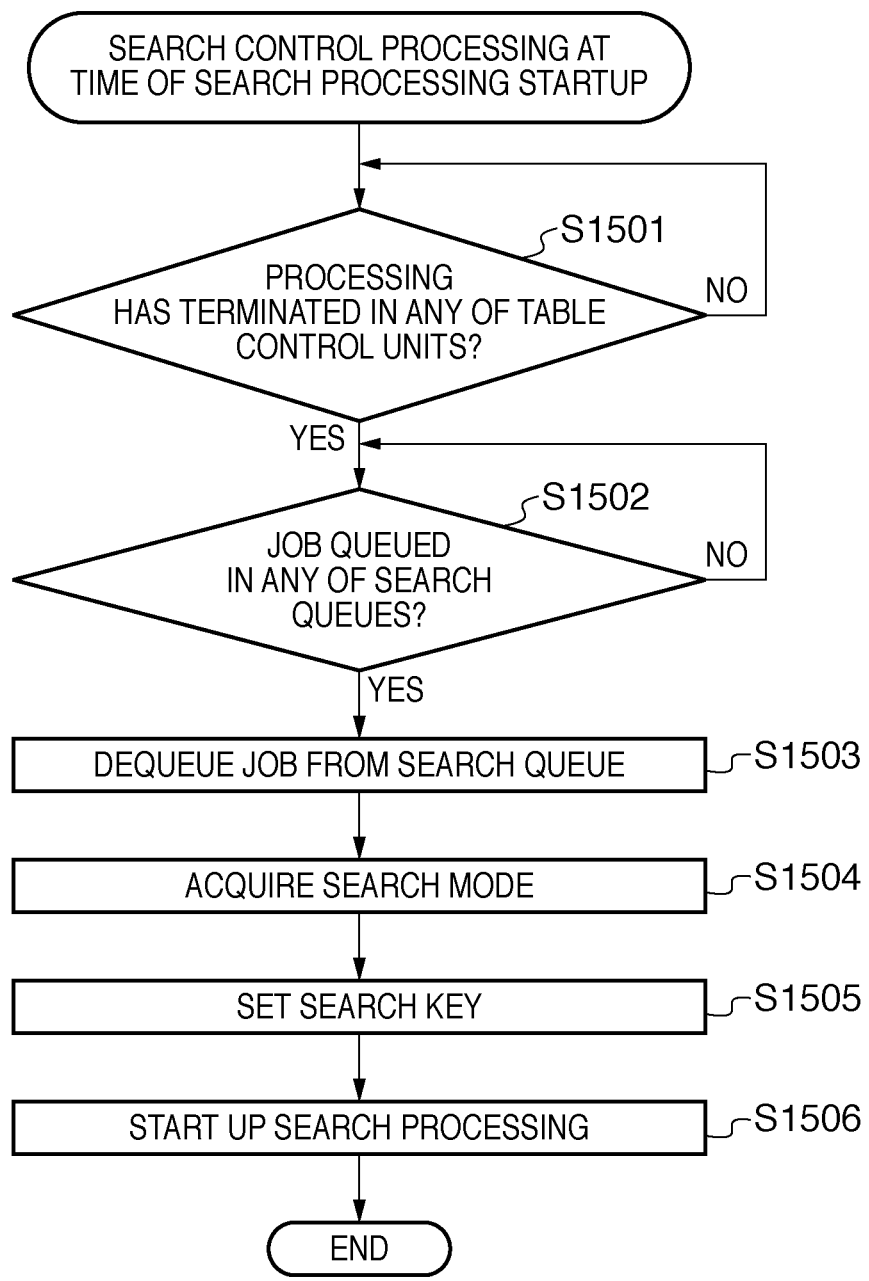
FIG. 15 is a diagram showing a flow of search control processing at the time of search processing startup performed by the search apparatus according to Embodiment 1.

In step S1402, the search control unit 204 starts up search processing according to the states of the internal memory table control unit 205 and the external memory table control unit 207. Below is a description of the search processing startup procedure performed by the search control unit 204 in step S1402, with reference to FIG. 15. In step S1501, the search control unit 204 determines whether search processing has terminated in either the internal memory table control unit 205 or the external memory table control unit 207. If search processing has not terminated in the internal memory table control unit or the external memory table control unit, the search control unit 204 waits until the search processing performed by either of these has terminated.

In step S1502, the search control unit 204 waits until the internal memory search job is queued in the internal memory processing queue 202 corresponding to the internal memory table control unit whose processing has been determined to have terminated in step S1501. Likewise, the search control unit 204 waits until the external memory search job is queued in the external memory processing queue 203 corresponding to the external memory table control unit.

In step S1503, the next internal memory search job or external memory search job is dequeued from the internal memory processing queue 202 or the external memory processing queue 203. In step S1504, the search mode is acquired from the internal memory search job or external memory search job that was dequeued in step S1503. In step S1505, the search key is acquired from the internal memory search job or external memory search job that was dequeued in step S1503, and the search key is set in the comparison unit 210. In step S1506, search processing is started up. This completes the search processing startup procedure performed by the search control unit 204.

Figure 14:
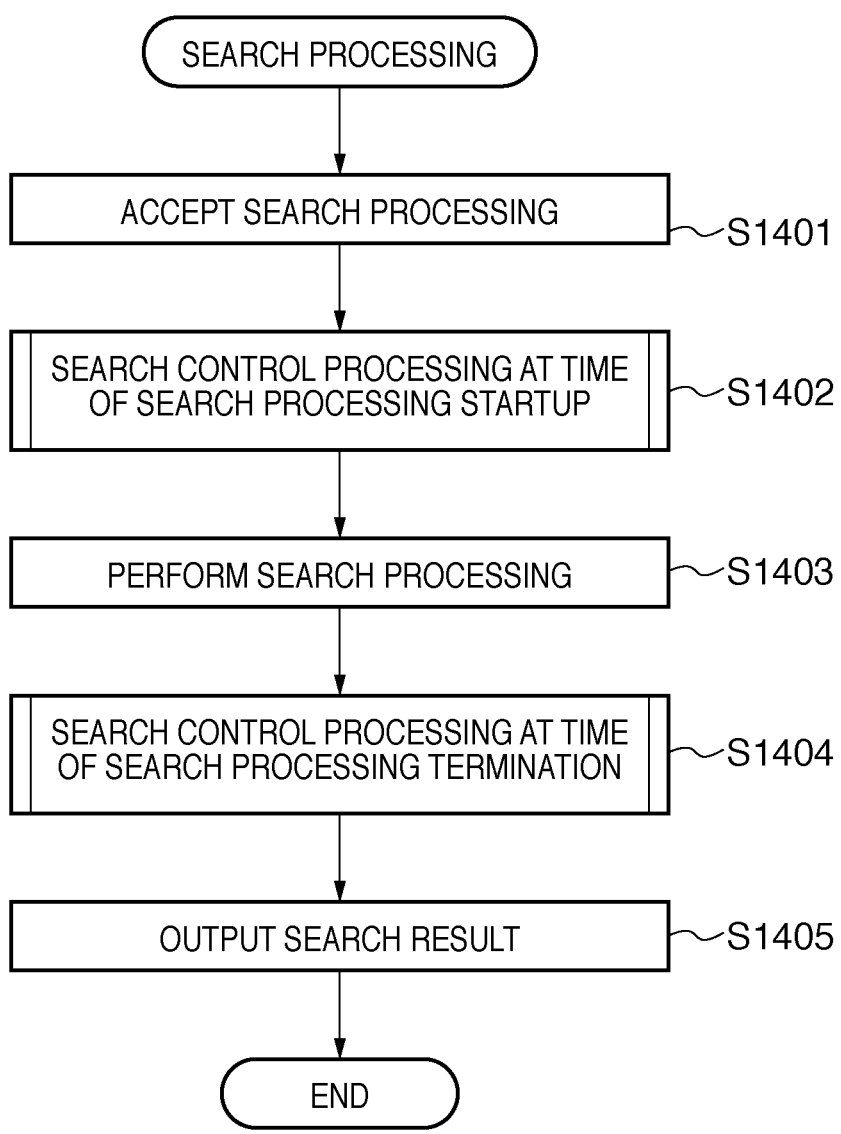
FIG. 14 is a diagram showing a flow of search processing performed by the search apparatus according to Embodiments 1 and 2.

Also, in step S1403 in FIG. 14, the common search unit 211 executes search processing. In the case of the internal memory search job, the search processing is executed by the internal memory table control unit 205 and the comparison unit 210. On the other hand, in the case of the external memory search job, the search processing is executed by the external memory table control unit 207 and the comparison unit 210.

The internal memory search job and the external memory search job are started asynchronously. In the internal memory search job and the external memory search job, entry data pieces in the search table are sequentially read out, the comparison unit 210 performs processing for comparing the search key and the read out entry data pieces, and the result of the comparison is notified to the search control unit 204. In the processing for notifying the result of the comparison, the information that is transferred includes information indicating whether the search job is the internal memory search job or the external memory search job, entry memory address information, information indicating whether the result of the comparison was a match or a mismatch, and the like.

Also, when the reading out of the all the entry data pieces in the targeted search tables performed by the internal memory table control unit 205 and the external memory table control unit 207 terminates, the internal memory table control unit 205 and the external memory table control unit 207 notify the search control unit 204 that the reading out of all the entry data pieces has terminated. In step S1404, the search control unit 204 performs search processing termination determination. The processing in step S1404 is executed by the search control unit 204.

Figure 16:
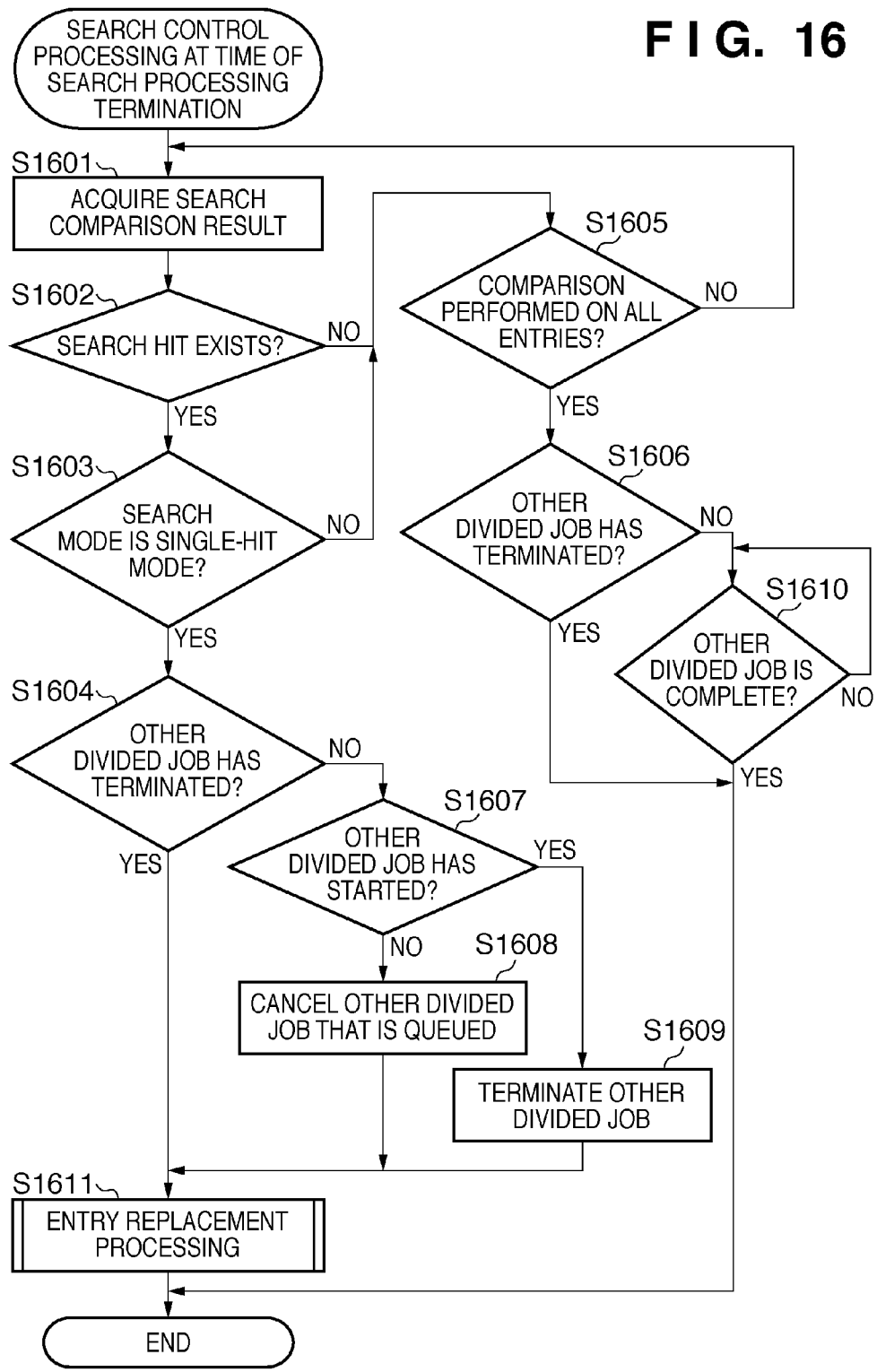
FIG. 16 is a diagram showing a flow of search control processing at the time of search termination determination performed by the search apparatus according to Embodiments 1 and 2.

The following describes processing performed by the search control unit 204 at the time of search processing termination with reference to FIG. 16. In step S1601, a comparison result is received from the comparison unit 210. In step S1602, it is determined whether the comparison result received in step S1601 indicates a search hit. In the case of a hit, the procedure proceeds to step S1603. In the case of no hit (a mismatch), the procedure proceeds to step S1605. In step S1603, it is determined whether the search mode of the search job is the single-hit mode. If the search mode is not the single-hit mode, it is determined that the search mode is the all-search mode.

In the case of the single-hit mode, in step S1604, it is determined whether the other job among the divided search jobs has terminated. If the other job among the divided search jobs has terminated, the procedure proceeds to step S1611. On the other hand, if the other job among the divided search jobs has not terminated, the procedure proceeds to step S1607. In step S1607, it is determined whether processing of the other job among the divided search jobs has started. In the case in which the processing has started, in step S1609, execution of the other job among the divided search jobs is terminated. If the processing has not started (the other job is queued in the processing queue), in step S1608 the other job queued in the processing queue is canceled. In step S1611, processing for replacing the storage locations of entries is performed. Below is a description of processing performed by the search control unit 204 in the case of replacing entry data in search tables.

Figure 19:
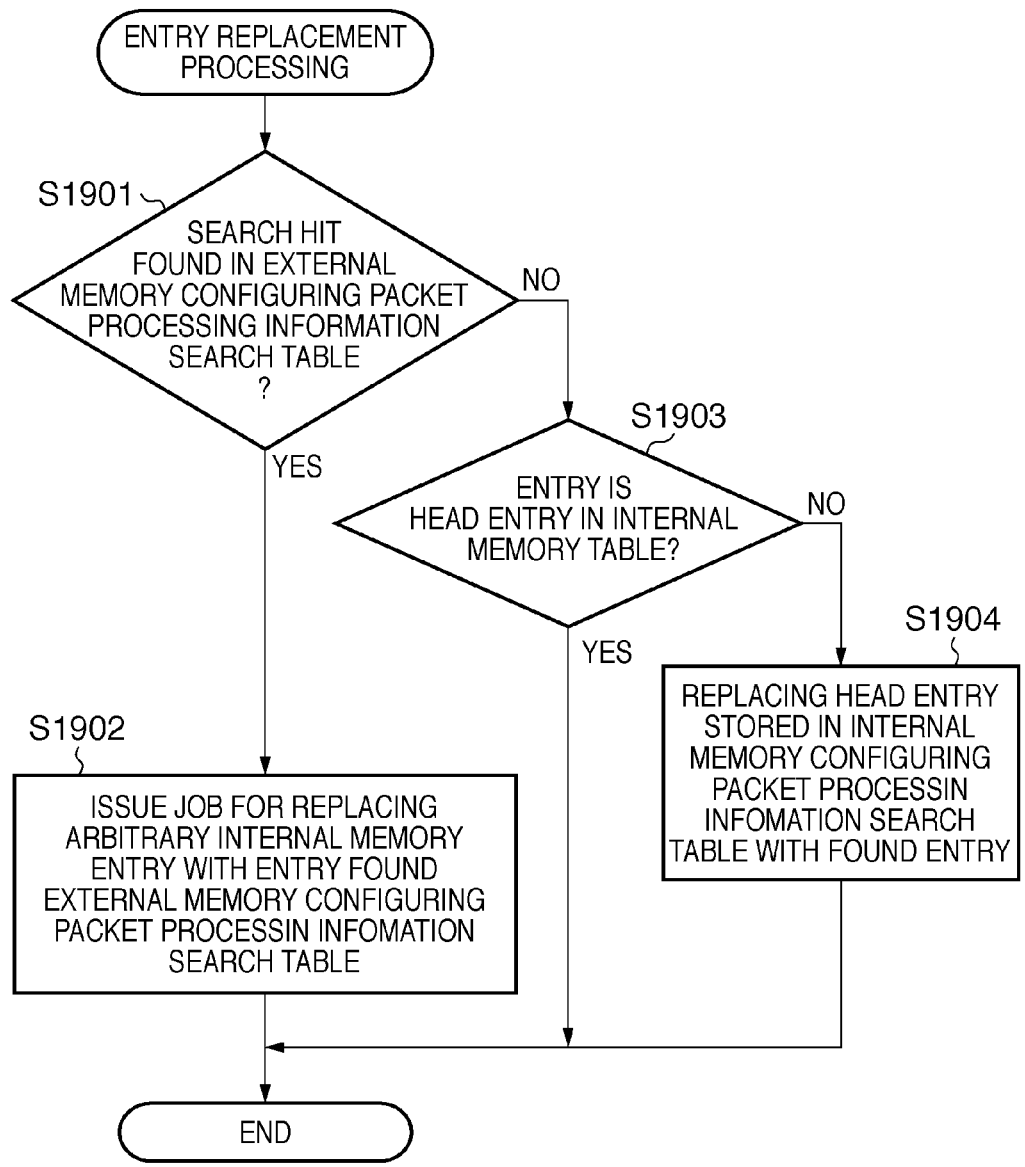
FIG. 19 is a diagram showing a flow of entry replacement processing according to Embodiments 1 and 2.

In step S1901 in FIG. 19, it is determined whether a search hit exists in the external memory configuring the packet processing information search table. If an entry hit is found in the external memory, in step S1902 a job is issued for replacing an arbitrary internal memory entry with the entry hit found in the external memory configuring the packet processing information search table (first replacing), and the job is queued in the processing queues. The arbitrary internal memory entry is managed using a round robin method, excluding the head entry, and the selected entry is updated each time replacement with an external memory entry is performed. Although an internal memory entry that is to be replaced is selected as described above in the present embodiment, the internal memory entry to be replaced may be the head entry in the internal memory, or may be an internal memory entry selected by LRU or the like, or another arbitrary algorithm. On the other hand, if a hit exists in the internal memory, the procedure proceeds to step S1903. In step S1903, it is determined whether the entry is the head entry in the internal memory table. If the entry is the head entry in the internal memory, the entry replacement processing is terminated. On the other hand, if the entry is not the head entry in the internal memory, the procedure proceeds to step S1904. In step S1904, the head entry stored in the internal memory configuring the packet processing information search table is immediately replaced with the hit entry (second replacing). In this case, a method may be used in which instead of replacing the entries, searching is started from the hit entry during the next search. Also, instead of the head entry, a group of entries on which searching is performed with priority may be used. Although entry data replacement processing is performed using the procedure described above in the present embodiment, it is only necessary for the procedure to achieve consistency so that portions of a search table can be disposed in an internal memory and an external memory and logically configure a single search table.

If it is determined in step S1603 that the search mode is the all-search mode instead of the single-hit search mode, in step S1605 it is determined whether a comparison of the search key and all the entry data pieces has been performed. Specifically, it is determined whether the search control unit 204 has received a notification that readout of all entry data pieces is complete from the external memory table control unit 207 or the internal memory table control unit 205. In the case in which the comparison of the search key and all the entry data pieces has been performed, the procedure proceeds to step S1606. In the case in which the comparison of the search key and all the entry data pieces has not been performed, the procedure returns to step S1601. In step S1606, it is determined whether the other job among the divided search jobs has terminated. If the other job among the divided search jobs has terminated, the processing is terminated. If the other job among the divided search jobs has not terminated, in step S1610 the completion of the other job among the divided search jobs is waited for, and the processing is terminated upon completion. This completes the flow of search control processing performed at the time of search processing termination by the search control unit 204.

In step S1405 in FIG. 14, the search result notification unit 209 notifies the termination of the search and the search result to the sub processor that issued the search processing request.

The following describes processing performed by the search processing accept unit 201 in the case of newly registering entry data to the search table.

Figure 17:
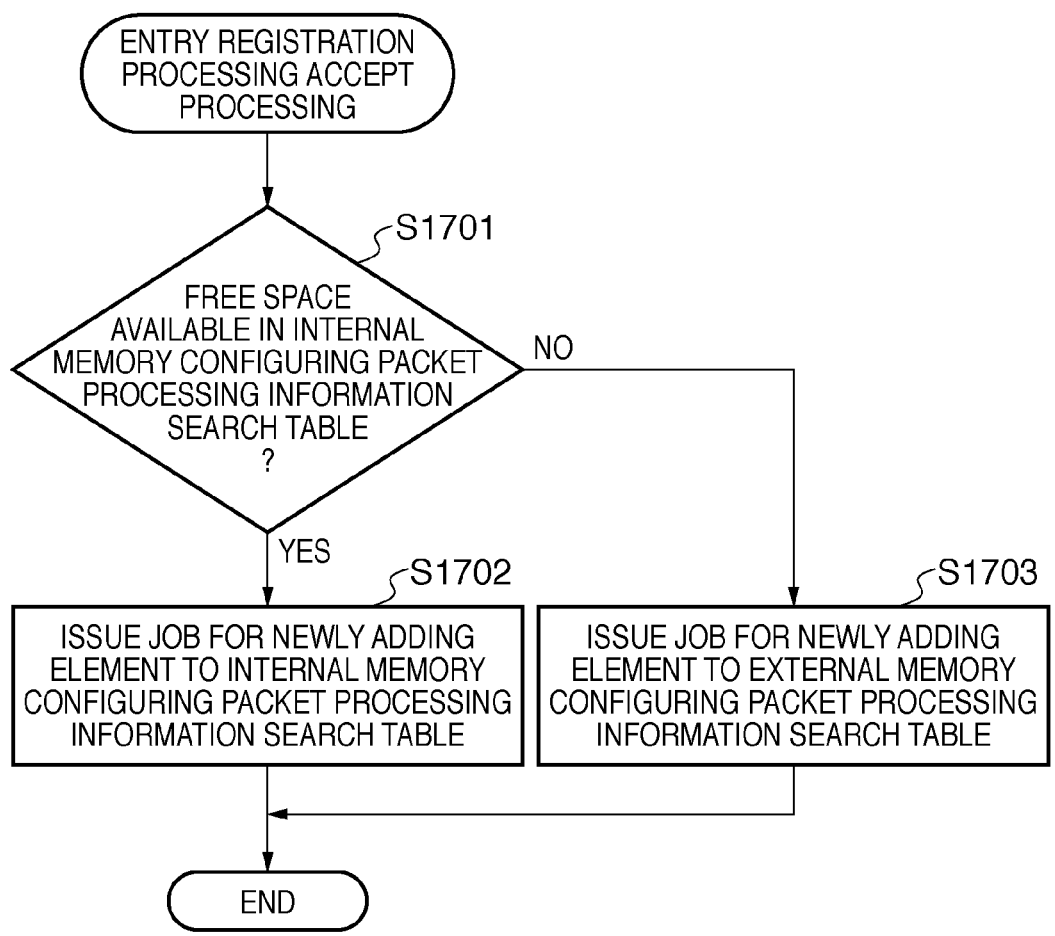
FIG. 17 is a diagram showing a flow of entry deletion processing accepting according to Embodiments 1 and 2.

In step S1701 in FIG. 17, it is determined whether free space is available in the internal memory configuring the search table. If free space is available, in step S1702 a job is issued for newly adding entry data to the internal memory configuring the search table, and the adding job is enqueued in the internal memory processing queue 202. If free space is not available, in step S1703 a job is issued for newly adding entry data to the external memory configuring the search table, and the adding job is enqueued in the external memory processing queue 203.

In the registration processing, the adding job that is issued is for either the internal memory processing job or the external memory processing job. Although registration processing is performed using the procedure described above in the present embodiment, it is only necessary for the procedure to achieve consistency so that portions of a search table can be disposed in an internal memory and an external memory and logically configure a single search table.

Figure 18:
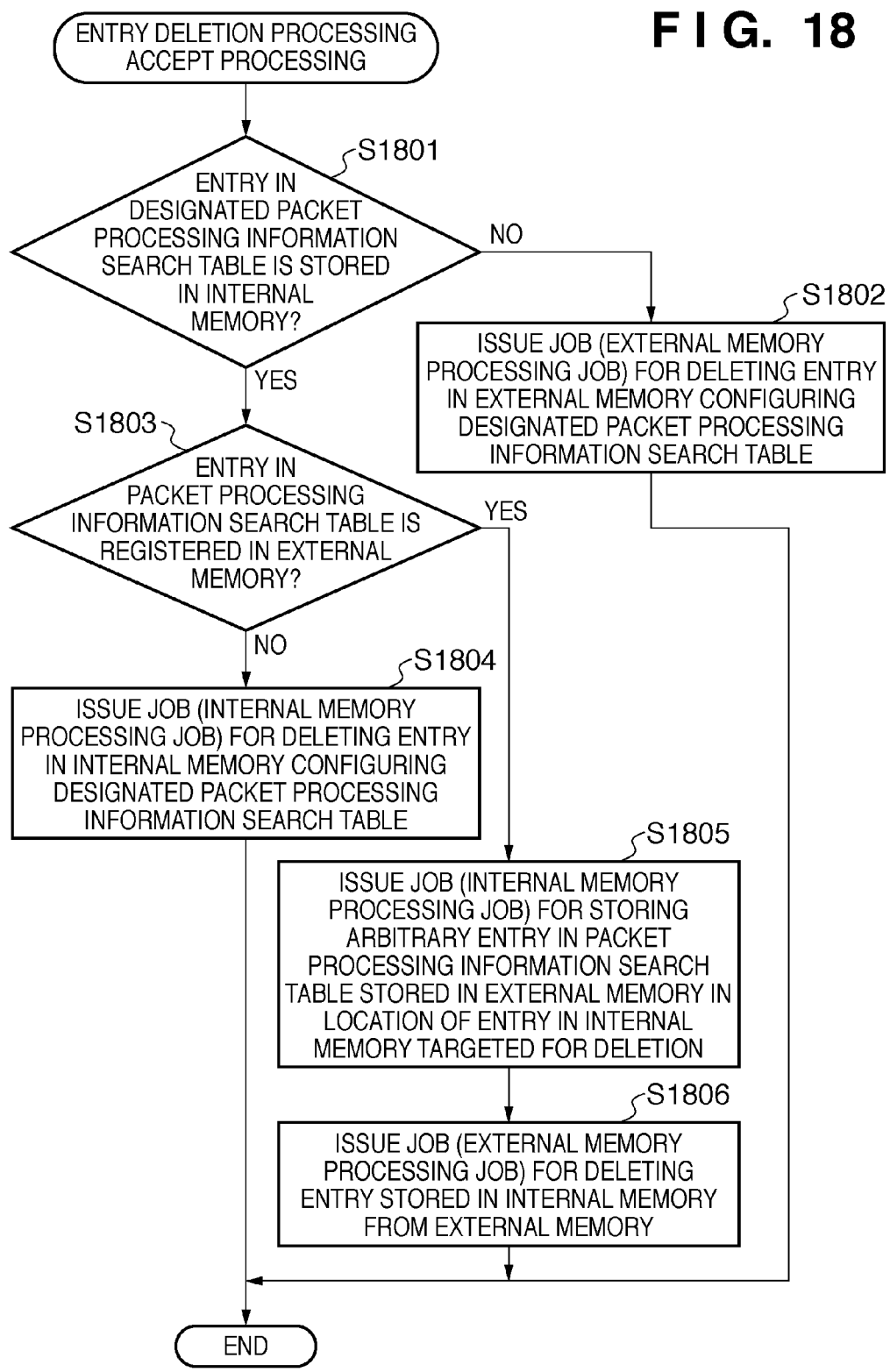
FIG. 18 is a diagram showing a flow of entry registration processing accept processing according to Embodiments 1 and 2.

The following describes deletion processing performed by the search processing accept unit 201 in the case of deleting entry data from the search table. In step S1801 in FIG. 18, it is determined whether entry data in a designated search table is stored in the internal memory. In the case of not being stored in the internal memory, in step S1802 a job is issued for deleting that entry data in the external memory configuring the designated search table, and the deleting job is enqueued in the external memory processing queue 203. In the case of being stored in the internal memory, in step S1803 it is determined whether entry data of the search table is registered in the external memory. In the case of not being registered, in step S1804 a job is issued for deleting the entry data in the internal memory configuring the designated search table, and the deleting job is enqueued in the internal memory processing queue 202.

In the case of being registered, in step S1805, a job is issued for storing arbitrary entry data of the search table stored in external memory to the location of entry data in the internal memory that is targeted for deletion, and the storing job is enqueued in the internal memory processing queue 202. In step S1806, a deleting job is issued for deleting the entry data stored in the internal memory from the external memory, and the deleting job is enqueued in the external memory processing queue 203. The order in which the storing job issued in step S1805 and the deleting job issued in step S1806 are enqueued and executed is arbitrary. In the case of executing the storing job issued in step S1805 first, the internal memory table control unit 205 reads out, from the external memory, the entry data that is to be moved from the external memory to the internal memory, and registers the read out entry data to the location of the entry data in the internal memory. In this case, the deleting processing issued in step S1806 is processing for only deleting entry data, likewise to the deleting job issued in step S1802.

On the other hand, in the case of executing the deleting job issued in step S1806 first, the external memory table control unit 207 reads out, from the external memory, the entry data that is to be moved from the external memory to the internal memory, transfers the entry data to the search control unit 204, and deletes the entry data. The search control unit 204 adds the read out external memory entry data to the storing job that was issued in step S1805 and is queued in the internal memory processing queue 202. The internal memory table control unit 205 registers the external memory entry data added to the storing job in the internal memory. In the case of executing the storing job issued in step S1805, it is determined whether the external memory entry data has been added, and whether reading out from the external memory is to be performed.

Although the processing for deleting entry data registered in the search table is performed using the procedure described above in the present embodiment, it is only necessary for the procedure to achieve consistency so that portions of a search table can be disposed in an internal memory and an external memory and logically configure a single search table. Also, although an arbitrary entry may be selected as the external memory entry that is to be moved to the internal memory when an internal memory entry has been deleted, efficiency in external memory searching is improved if the last entry in the external memory is selected. Likewise, in the case in which an external memory entry has been deleted, efficiency in external memory entry searching is improved if the last entry among the external memory entries is moved to and stored in the memory location of the deleted external memory entry.

Next is a description of a sequence of search processing executed in packet reception processing performed by the sub processors included in the TOE sub system 105. In FIGS. 6, 7, and 8A, 8B, the time axis progresses from top to bottom. In step S601 in FIG. 6, the sub processor D 114 receives a packet A, and thereafter starts the MAC driver 505 and IP protocol processing in packet reception processing. In step S602, the sub processor D 114 performs processing for searching packet processing information 1 in packet processing. In step S603, in order to perform processing for searching the packet processing information 1, the sub processor D 114 sets the search key and sets parameters such as the search mode (condition) in the search apparatus 122, and issues a search processing request to the search apparatus 122. This may be performed using a method of writing the parameters such as the search key and search mode (condition) in the register in the search apparatus 122, or a method of disposing the parameters in a block in a specified format in a memory, and writing the address thereof in the register. Note that in this case, the search mode is set so that operations are performed in the all-search mode in which there is the possibility of finding a plurality of corresponding entry data pieces.

In step S604, the search apparatus 122 performs search processing in accordance with the search key and search mode (condition) that have been set. In step S605, the search processing is completed, and the search apparatus 122 notifies the termination of the search and the search result to the sub processor D 114. The notification of the termination of the search may be performed by a method of interrupting the sub processor D 114, or a method in which the sub processor D 114 polls a flag in a memory or a register. Also, the search result may be notified by being displayed in the register of the search result notification unit 209 or being disposed in a memory.

In step S606, the MAC driver 505 and the IP protocol processing are completed, and the sub processor D 114 transfers a packet A to the sub processor B 112. Then, the sub processor B 112 starts TCP or UDP protocol processing in packet reception processing. Then in step S607, a next packet B is received, and packet processing is started likewise to step S601. In step S608, the sub processor D 114 performs search processing likewise to step S602. In step S609, a search processing request in which the search mode is the single-hit mode is issued likewise to step S603.

In step S610, the search apparatus 122 performs search processing in accordance with the search key and search mode (condition) that have been set. The operations performed in step S610 will be described later with reference to FIG. 7. In step S611, the sub processor B 112 performs processing for searching packet processing information 2 in packet processing.

In step S612, in order to search the packet processing information 2, the sub processor B 112 sets the parameters such as the search key and search mode (condition) in the search apparatus 122, and issues a search processing request to the search apparatus 122. Note that in this case, the search mode is set so that operations are performed in the single-hit mode in which it is only necessary to find one entry data piece that matches the search key.

In step S613, the search processing is completed, and likewise to step S605, the search apparatus 122 transfers a search termination notification and the search result to the sub processor B 112. In step S614, the search processing is completed, and likewise to step S613, the search apparatus 122 transfers a search termination notification and the search result to the sub processor D 114.

Although an exemplary case in which the processing of step S613 and step S614 is performed in the stated order is described in the present embodiment, in actuality the search termination notifications and search results are transferred to the sub processor B 112 and the sub processor D 114 in the order in which the search processing terminates.

In step S615, transfer of the packet B is performed likewise to step S606. As can be seen in step S609 and step S612, in consecutive reception packet processing, even if the search apparatus 122 is executing search processing, a search request may be issued from another processor. According to the sequence shown in FIG. 6 described above, the search apparatus 122 operates upon receiving processing requests from the sub processors.

Figure 7:
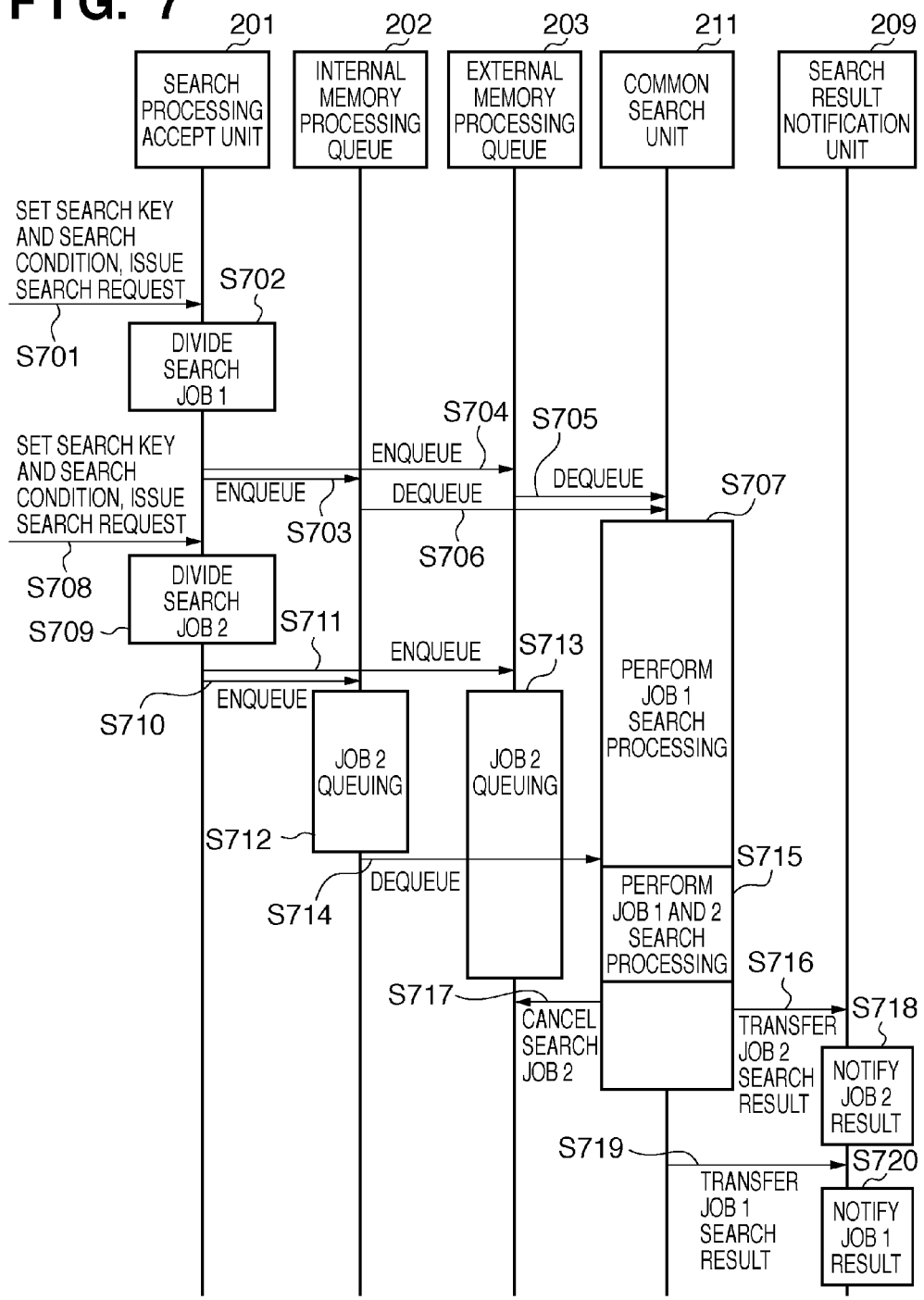
FIG. 7 is a diagram illustrating a processing sequence performed in the search apparatus according to Embodiment 1.

The following describes the search processing performed in step S610 by the search apparatus 122 with reference to FIG. 7. The processing in step S701 is the same as the processing in step S609. Also, the processing in step S708 is the same as the processing in step S612. In step S701, the sub processor D 114 sets parameters such as the search key and the search mode (condition) and issues a search processing request, and the search processing accept unit 201 accepts the search processing request and creates the search job 1. Here, the search mode is designated to be the all-search mode.

In step S702, the search processing accept unit 201 divides the search job 1 into the internal memory search job 1 and the external memory search job 1. In step S703, the internal memory search job 1 obtained by dividing in step S702 is enqueued in the internal memory processing queue 202. In step S704, the external memory search job 1 obtaining by dividing in step S702 is enqueued in the external memory processing queue 203. In step S705, the external memory search job 1 queued in the external memory processing queue 203 is dequeued by the common search unit 211. In step S706, the internal memory search job 1 queued in the internal memory processing queue 202 is dequeued by the common search unit 211. In step S707, the common search unit 211 executes the search processing of the internal memory search job 1 and the external memory search job 1.

In step S708, likewise to step S701, the search processing accept unit 201 accepts the search processing request and creates the search job 2. In the present embodiment, the search mode is designated to be the single-hit search mode. In step S709, likewise to step S702, the search job 2 is divided into the internal memory search job 2 and the external memory search job 2. In step S710, likewise to step S703, the internal memory search job 2 is enqueued in the internal memory processing queue 202. In step S711, likewise to step S704, the external memory search job 2 is enqueued in the external memory processing queue 203. In step S712, the internal memory search job 2 is queued in the internal memory processing queue 202. In step S713, the external memory search job 2 is queued in the external memory processing queue 203.

In step S714, since the internal memory search job 1 performed by the common search unit 211 in step S707 terminates, the common search unit 211 dequeues the internal memory search job 2 queued in the internal memory processing queue 202. The details of these operations will be described later with reference to FIGS. 8A and 8B. In step S715, the common search unit 211 executes the search processing of the internal memory search job 2 and the external memory search job 1.

In step S716, since the search result required in the search mode designated in the search job 2 is that a single hit is to be found, a hit between entry data and the search key in the internal memory search job 2 is found, and the processing terminates. Accordingly, the common search unit 211 transfers the search result of the search job 2 to the search result notification unit 209. The details of these operations will be described later with reference to FIGS. 8A and 8B. In step S717, the search job 2 terminates due to the termination of the internal memory search job 2. Accordingly, the search control unit 204 cancels the external memory search job 2 queued in the external memory processing queue 203.

In step S718, the search result notification unit 209 notifies the termination of the search job 2 and the search result to the sub processor B 112 that issued the search processing request in step S708. In step S719, the search job 1 terminates, and the common search unit 211 transfers the search result of the search job 1 to the search result notification unit 209. In step S720, the search result notification unit 209 notifies the termination of the search job 1 and the search result to the sub processor D 114 that issued the processing request in step S701. The operations performed by the common search unit 211 from step S705 onward will be described later with reference to FIGS. 8A and 8B.

Although an example of processing in which the internal memory search terminates first is described in the present embodiment, in actuality it is the order in which processing terminates that determines whether it is the next external memory search job or internal memory search job that is dequeued from the external memory processing queue 203 or the internal memory processing queue 202 and begun to be processed. This completes the search job processing performed by the search apparatus 122 according to the sequence shown in FIG. 7.

Figure 8B:
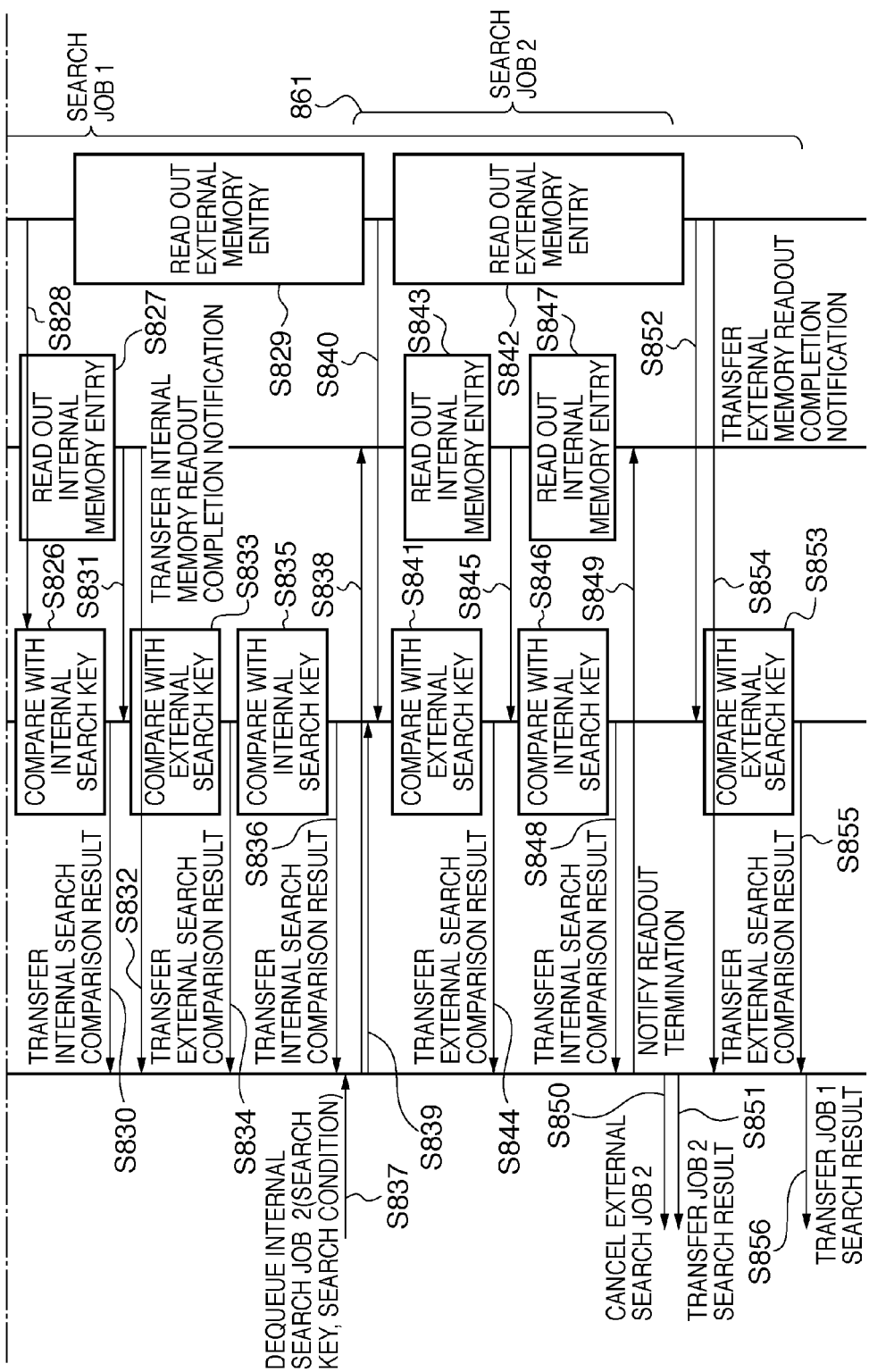

The following describes the search processing performed by the common search unit 211 in step S707 in FIG. 7, with reference to FIGS. 8A and 8B. The processing in step S801 is the same as the processing in step S706. Also, the processing in step S802 is the same as the processing in step S705. Furthermore, the processing in step S837 is the same as the processing in step S714. In step S801, the search control unit 204 dequeues the internal memory search job 1 from the internal memory processing queue 202. In step S802, the search control unit 204 dequeues the external memory search job 1 from the external memory processing queue 203. In step S837, the search control unit 204 dequeues the internal memory search job 2 from the internal memory processing queue 202. In step S803, the search control unit 204 acquires the search key from the internal memory search job 1 dequeued in step S801, and sets the acquired search key as the search key for internal memory searching in the comparison unit 210.

In step S804, the search control unit 204 issues a readout processing request to the internal memory table control unit 205, and starts up processing in which the internal memory table control unit 205 reads out entry data in the internal memory table 206 in the search job 1. In step S805, the search control unit 204 acquires the search key from the external memory search job 1 dequeued in step S801, and sets the acquired search key as the search key for external memory searching in the comparison unit 210. In step S806, the search control unit 204 issues a readout processing request to the external memory table control unit 207, and starts up processing in which the external memory table control unit 207 reads out entry data in the external memory table 208 in the search job 1.

In step S838, the search control unit 204 issues a readout processing request to the internal memory table control unit 205, and starts up processing in which the internal memory table control unit 205 reads out entry data in the internal memory table 206 in the search job 2. In step S839, the search control unit 204 acquires the search key from the internal memory search job 2 dequeued in step S837, and sets the acquired search key as the search key for internal memory searching in the comparison unit 210.

In step S807, step S811, step S815, step S821, step S827, step S843, and step S847, the internal memory table control unit 205 performs processing for reading out entry data from the internal memory table 206. Among these, the processing in step S807, step S811, step S815, step S821, and step S827 is processing for reading out search table entry data from the internal memory in the search job 1. Also, the processing in step S843 and step S847 is processing for reading out search table entry data from the internal memory in the search job 2.

In step S809, step S813, step S819, step S825, step S831, and step S845, the internal memory table control unit 205 transfers the read out entry data to the comparison unit 210. Among these, the processing in step S809, step S813, step S819, step S825, and step S831 is processing for transferring entry data in the search job 1. Also, the processing in step S845 is processing for transferring entry data in the search job 2.

In step S810, step S814, step S823, step S826, step S835, and step S846, the comparison unit 210 performs comparison processing. Among these, the processing in step S810, step S814, step S823, step S826, and step S835 is comparison processing in the search job 1. Also, step S846 is comparison processing in the search job 2. In the case of these instances of comparison processing, the search key that is used is the search key for internal memory searching that was set by the search control unit 204, and the search target data that is used is the data received from the internal memory table control unit 205. In step S808, step S817, step S829, and step S842, the external memory table control unit 207 performs processing for reading out search table entry data from the external memory table 208. The processing in step S808, step S817, step S829, and step S842 is processing for reading out search table entry data from the external memory in the search job 1.

In step S816, step S828, step S840, and step S852, the external memory table control unit 207 transfers the read out search table entry data to the comparison unit 210. The processing in step S816, step S828, step S840, and step S852 is processing for transferring entry data in the search job 1.

In step S820, step S833, step S841, and step S853, the comparison unit 210 performs comparison processing. Among these, the processing in step S820, step S833, step S841, and step S853 is comparison processing in the search job 1. In the case of these instances of comparison processing, the search key that is used is the search key for external memory searching that was set by the search control unit 204, and the search target data that is used is the entry data received from the external memory table control unit 207. In step S832, the internal memory table control unit 205 notifies the search control unit 204 that the reading out of all the entry data in the internal memory table 206 in the search job 1 has terminated. In step S854, the external memory table control unit 207 notifies the search control unit 204 that the reading out of all the entry data in the external memory table 208 in the search job 1 has terminated. In step S812, step S818, step S824, step S830, step S836, and step S848, the comparison unit 210 notifies the result of the comparison of the search key for internal memory searching and the entry data to the search control unit 204. Among these, the processing in step S812, step S818, step S824, step S830, and step S836 is notification processing in the search job 1. Also, the processing step S848 is notification processing in the search job 2. Upon receiving the notification of the comparison result, the search control unit 204 makes a termination determination in accordance with the processing flow performed at the time of search processing termination shown in FIG. 16. In the termination determination performed after the processing in step S836, the search control unit 204 has received, from the internal memory table control unit 205, notification that the reading out of all the entry data in the internal memory table 206 has terminated, and therefore terminates the internal memory search job 1. Also, in the termination determination made by the search control unit 204 after the processing of step S848, one entry data piece has been found in the search job 2, and the search mode of the search job 2 is the single-hit mode, and therefore processing for terminating the search job 2 is started.

In step S822, step S834, step S844, and step S855, the comparison unit 210 notifies the result of the comparison of the search key for external memory searching and the entry data to the search control unit 204. The processing in step S822, step S834, step S844, and step S855 is comparison processing in the search job 1. Upon receiving the notification of the comparison result, the search control unit 204 makes a termination determination in accordance with the processing flow performed at the time of search processing termination shown in FIG. 16. Note that in the termination determination performed after the processing in step S855, the search control unit 204 has received, from the external memory table control unit 207, notification that the reading out of all the entries in the external memory table 208 has terminated, and therefore terminates the external memory search job 1. Furthermore, accordingly, the internal memory search job 1 and the external memory search job 1 terminate, and therefore processing for terminating the search job 1 is started.

In step S849, the search job 2 is terminated, and therefore the search control unit 204 notifies the termination of reading out to the internal memory table control unit 205. In step S850, the search job 2 is terminated, and therefore the search control unit 204 performs processing for canceling the external memory search job 2 queued in the external memory processing queue 203. In step S851, the search job 2 has terminated, and therefore the search control unit 204 transfers the search processing result of the search job 2 to the search result notification unit 209. In step S856, the search job 1 has terminated, and therefore the search control unit 204 transfers the search processing result of the search job 1 to the search result notification unit 209.

In FIGS. 8A and 8B, processing of the search job 1 is performed in a period 860. Also, processing of the search job 2 is performed in a period 861. This completes the description of the processing performed by the search apparatus 122 taking the example of searching executed in packet reception processing in the TOE sub system 105.

According to the present embodiment, a search job is divided into an internal memory search job and an external memory search job, and the jobs are processed in concurrent, thus enabling the internal memory search processing to be performed while the external memory readout processing is being performed. This enables reducing the decrease in search processing performance in the case where a single search table is logically configured using an internal memory and an external memory. Furthermore, even while one of the memories is being searched in a job of a search request that has been input, if the searching of the other memory has terminated, processing of the search job of the next search request can be started. Also, by designating the search mode, in the case of the single-hit mode, one job is immediately terminated if a search hit is found in the other job, thus eliminating unnecessary processing of divided jobs. Also, the external memory search job or the internal memory search job is canceled from the external memory processing queue or the internal memory processing queue, thus eliminating unnecessary processing of divided jobs. For this reason, in the case in which the search apparatus is shared among a plurality of processors, it is possible to partially shorten the delay time imposed on the processing of a search job by another search job whose search processing takes a longer time, and efficiently process consecutive search requests. Furthermore, it is possible to maximize search processing performance by prioritizing use of the high-speed internal memory over the low-speed external memory, through, when an internal memory entry has been deleted, storing an arbitrary external memory entry in the location of the deleted internal memory entry. Also, in the case of the single-hit mode, the storage location of an arbitrary internal memory entry is replaced with the storage location of a search hit entry in the external memory table, thereby enabling efficiently processing consecutive packet search requests.

Embodiment 2

FIGS. 1, 4, 5, 6, 14, 16, 17, and 18 that were described in Embodiment 1 also apply to the present embodiment.

Figure 3:
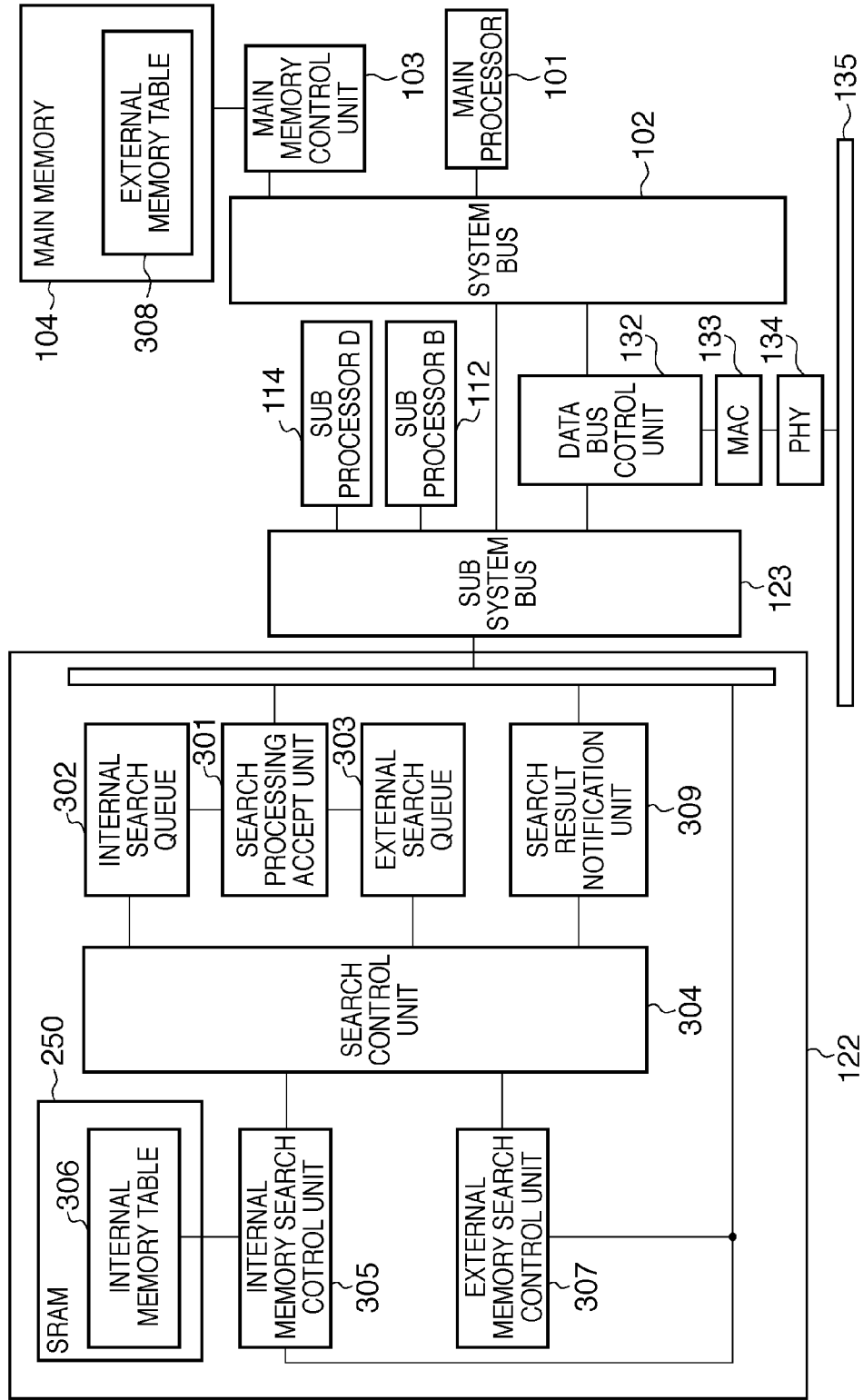
FIG. 3 is a diagram illustrating a configuration of a search apparatus according to Embodiment 2.

The following describes an exemplary configuration of the search apparatus 122 included in the TOE sub system 105 according to Embodiment 2. The search apparatus 122 in FIG. 3 is connected to the sub system bus 123 of the TOE sub system 105. The search apparatus 122 executes search processing in protocol processing upon receiving a request from the sub processors, and transmits the search result back to the sub processors. In such cases, the sub processors set a search key, set parameters such as the search mode, and issue a search processing request. One of the search modes is the single-hit mode in which only one entry data piece among the search target data needs to be found as the required search result, and another is the all-search mode in which comparison between the search key and all the entry data pieces needs to be performed. Also, the search apparatus 122 performs processing for registering entry data in the search table as well as deletion processing upon receiving a request from the sub processors. The search apparatus 122 includes a search processing accept unit 301 that accepts search processing, processing for registering entry data in the internal memory of the search apparatus 122 and external memory referenced by the search apparatus 122, and deletion processing, and issues an internal memory processing job and an external memory processing job. In the system shown in FIG. 1, the external memory corresponds to the main memory 104. Also, the search apparatus 122 in FIG. 3 includes an internal search queue 302 as a first queuing unit that queues an internal memory processing job, and an external search queue 303 as a second queuing unit that queues an external memory processing job. Also, the search apparatus 122 includes a search control unit 304 that analyzes the internal memory processing job and external memory processing job received by the search processing accept unit 301, and controls search processing, registration processing, and deletion processing. Furthermore, the search apparatus 122 includes an internal memory table 306 that stores entry data targeted for searching, and an internal memory search control unit 305 that performs processing on the internal memory table 306. Note that the shared memory 125 included in the TOE sub system 105 may be used for the internal memory table 306. Also, the search apparatus 122 includes an external memory search control unit 307 that performs processing on an external memory table 308 that stores entry data targeted for searching. The internal memory search control unit 305 and the external memory search control unit 307 perform processing in accordance with jobs that have been dequeued from the search queues by the search control unit 304, and notify the results of such processing to the search control unit 304. In the case in which the internal memory search control unit 305 performs search processing, a series of search processing is performed in which entry data is read out from the internal memory table 306 and compared with the search key. Although this series of operations is performed by the internal memory search control unit 305 and the external memory search control unit 307 in the present embodiment, the series of operations may be performed by a mechanism for performing common processing as long as the internal memory search processing and the external memory search processing can be performed in parallel.

Figure 12:
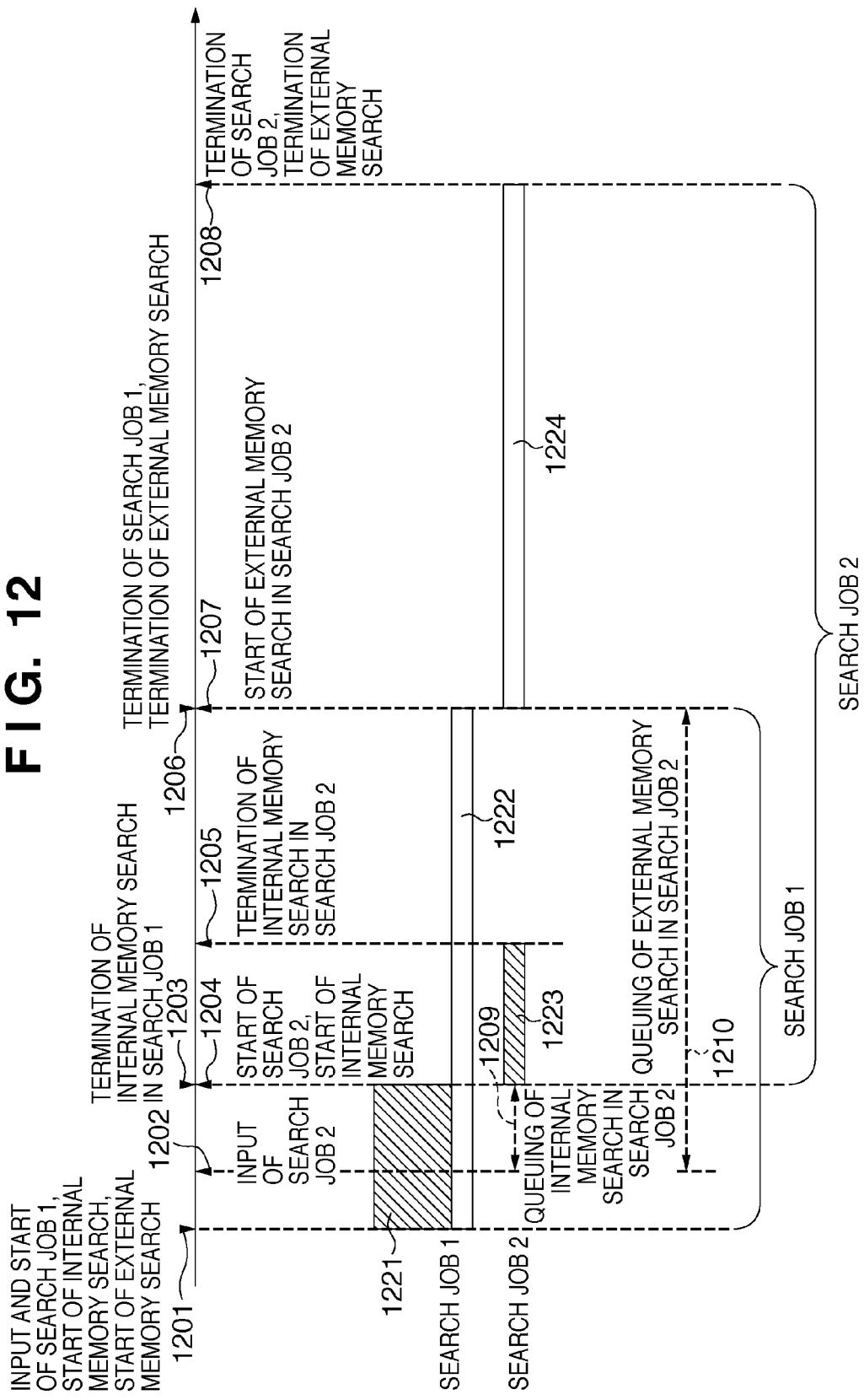
FIG. 12 is a diagram showing timings of the start, termination, and the like of search jobs (all-search mode) according to Embodiment 2.
Figure 13:
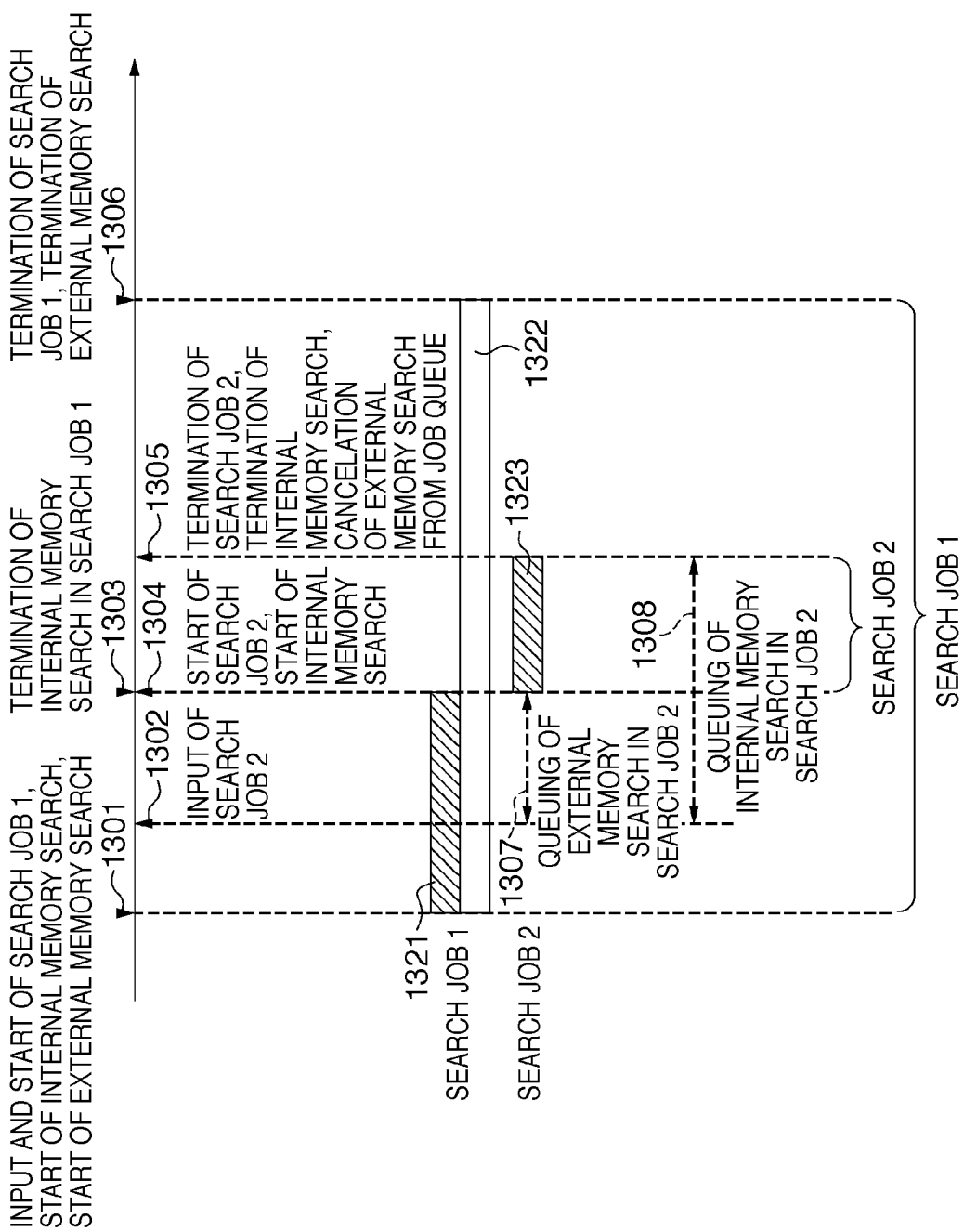
FIG. 13 is a diagram showing timings of the start, termination, and the like of search jobs (single-hit mode) according to Embodiment 2.

The following describes timings of the search processing performed by the internal memory search control unit 305 and the external memory search control unit 307. In FIGS. 12 and 13, time progresses from left to right. Below is a description of a case in which requests have been issued for a search job 1 and a search job 2 to both be processed in the all-search mode, with reference to FIG. 12. At a time 1201, a search processing request is issued, and the search job 1 is input. The search job 1 starts immediately after the input of the search job 1, and then search processing of the internal memory search job 1 and the external memory search job 1, into which the search job 1 was divided, starts. The internal memory search job 1 is executed by the internal memory search control unit 305, and the external memory search job 1 is executed by the external memory search control unit 307. The internal memory search control unit 305 and the external memory search control unit 307 execute this processing in parallel.

At a time 1202, the next search processing request is issued, and the search job 2 is input. At this time, the internal memory search control unit 305 and the external memory search control unit 307 are respectively performing the processing of the internal memory search job 1 and the external memory search job 1. For this reason, the internal memory search job 2 and the external memory search job 2, into which the search job 2 was divided, are enqueued in the internal search queue 302 and the external search queue 303 respectively. The internal memory search job 2 is queued in the internal search queue 302 throughout a period 1209 that ends when the internal memory search control unit 305 finishes the processing of the internal memory search job 1 and the internal memory search job 2 is dequeued as the next job by the search control unit 304. Likewise, the external memory search job 2 is queued in the external search queue 303 throughout a period 1210 that ends when the external memory search control unit 307 finishes the processing of the external memory search job 1 and the external memory search job 2 is dequeued as the next job by the search control unit 304.

At a time 1203, the searching of all the entry data pieces by the internal memory search control unit 305 is completed, the internal memory search job 1 terminates, and immediately at a time 1204, the internal memory search job 2 is dequeued by the search control unit 304, and the processing thereof starts. At a time 1205, the searching of all the entry data pieces by the internal memory search control unit 305 is completed, and the internal memory search job 2 terminates. At this time, since a next internal memory search job is not queued, the internal memory search control unit 305 waits until the next internal memory search job has been input and started up. At a time 1206, the searching of all the entry data pieces by the external memory search control unit 307 is completed, the external memory search job 1 is completed, and therefore the search job 1 is completed, and accordingly the search result notification unit 309 notifies the search result to the sub processor that issued the search processing request. Also, at a time 1207, the external memory search job 2 is dequeued by the search control unit 304, and the processing thereof starts. At a time 1208, the searching of all the entry data pieces by the external memory search control unit 307 is completed, the external memory search job 2 is completed, and therefore the search job 2 is completed, and accordingly the search result notification unit 309 notifies the search result to the sub processor that issued the search processing request.

Between the time 1201 and the time 1206 is when the search job 1 is being executed, and between the time 1204 and the time 1208 is when the search job 2 is being executed. An interval 1221 is a period during which the internal memory search control unit 305 is performing the processing of the internal memory search job 1 in the search job 1. An interval 1222 is a period during which the external memory search control unit 307 is performing the processing of the external memory search job 1 in the search job 1. An interval 1223 is a period during which the internal memory search control unit 305 is performing the processing of the internal memory search job 2 in the search job 2. An interval 1224 is a period during which the external memory search control unit 307 is performing the processing of the external memory search job 2 in the search job 2. In this way, the processing of an internal memory search job and the processing of an external memory search job are performed in parallel.

Below is a description of a case in which requests have been issued for the search job 1 and the search job 2 to both be processed in the single-hit mode, with reference to FIG. 13.

At a time 1301, a search processing request is issued, and the search job 1 is input. The search job 1 starts immediately after the input of the search job 1, and then search processing of the internal memory search job 1 and the external memory search job 1, into which the search job 1 was divided, starts. The internal memory search job 1 is executed by the internal memory search control unit 305, and the external memory search job 1 is executed by the external memory search control unit 307. The internal memory search control unit 305 and the external memory search control unit 307 execute this processing in parallel. At a time 1302, the next search processing request is issued, and the search job 2 is input. At this time, the internal memory search control unit 305 and the external memory search control unit 307 are respectively performing the processing of the internal memory search job 1 and the external memory search job 1 into which the search job 1 was divided. For this reason, the internal memory search job 2 and the external memory search job 2, into which the search job 2 was divided, are enqueued in the internal search queue 302 and the external search queue 303 respectively. The internal memory search job 2 is queued in the internal search queue 302 throughout a period 1307 that ends when the internal memory search control unit 305 finishes the processing of the internal memory search job 1 and the internal memory search job 2 is dequeued as the next internal memory search job. Likewise, the external memory search job 2 is queued in the external search queue 303 throughout a period 1308 that ends when the external memory search control unit 307 finishes the processing of the external memory search job 1 and the external memory search job 2 is dequeued as the next external memory search job.

At a time 1303, the searching of all the entry data pieces by the internal memory search control unit 305 is completed without a hit between the search key and any of the entry data, and thus the internal memory search job 1 terminates. Then immediately at a time 1304, the internal memory search job 2 is dequeued by the search control unit 304, and the searching thereof starts. Since the search job 1 in which the search mode is the single-hit mode terminates without a hit in the internal memory search, notification of the result of the external memory search is waited for.

At a time 1305, the internal memory search job 2 is completed upon a hit being found, and therefore the search job 2 is completed, and the search result notification unit 309 notifies the search result to the sub processor that issued the search processing request. At this time, the external memory search job 2 is queued, and is in a processing standby condition, and therefore this job is canceled from the external search queue 303. At this time, since a next internal memory processing job is not queued, the internal memory search control unit 305 waits until the next internal memory processing job is input.

At a time 1306, the external memory search job 1 is completed upon a hit being found, and therefore the search job 1 is completed, and the search result notification unit 309 notifies the search result to the sub processor that issued the search processing request. At this time, since a next external memory processing job is not queued, the external memory search control unit 307 waits until the next external memory processing job is input. Between the time 1301 and the time 1306 is when the search job 1 is being executed, and between the time 1303 and the time 1305 is when the search job 2 is being executed.

An interval 1321 is a period during which the internal memory search control unit 305 is performing the processing of the internal memory search job 1 in the search job 1. An interval 1322 is a period during which the external memory search control unit 307 is performing the processing of the external memory search job 1 in the search job 1. An interval 1323 is a period during which the internal memory search control unit 305 is performing the processing of the internal memory search job 2 in the search job 2.

Since the internal memory search processing and the external memory search processing are performed in parallel in this way, and a job is terminated when a single entry data piece matches the search key according to the single-hit mode, it is anticipated that the search processing will finish sooner.

Figure 6:
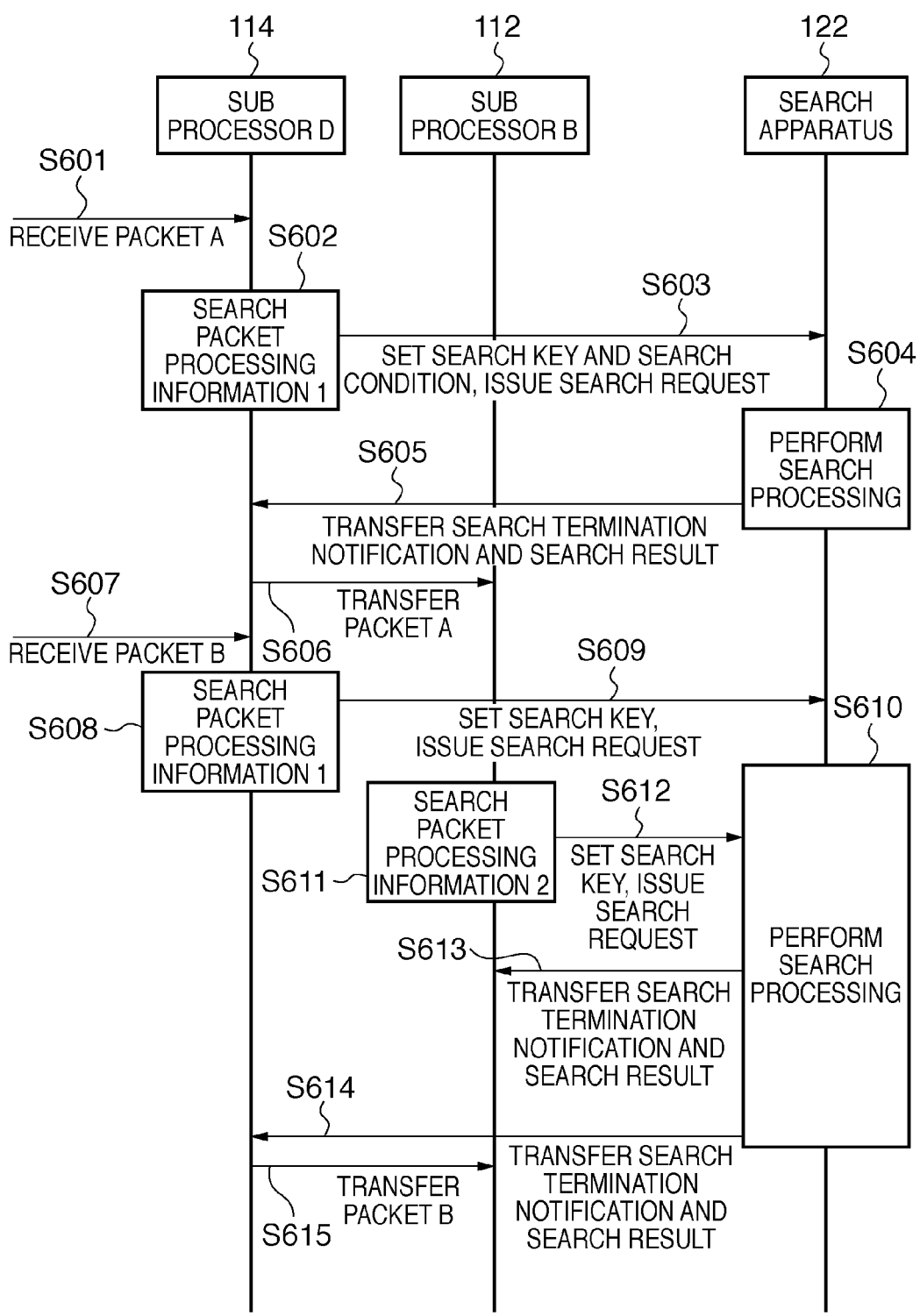
FIG. 6 is a diagram showing sequences performed by sub processors and the search apparatus in search processing at the time of packet reception processing according to Embodiments 1 and 2.

The following describes search processing in step S610, in the sequence of search processing executed in packet reception processing performed by the sub processors included in the TOE sub system 105 shown in FIG. 6. The processing in step S901 in FIG. 9 is the same as the processing in step S609 in FIG. 6. Likewise, the processing in step S911 is the same as the processing in step S612.

In step S901, the sub processor D 114 sets the search key, sets parameters such as the search mode (condition) and issues a search processing request, and thereafter the search processing accept unit 301 accepts the processing and analyzes the search job 1. In step S902, the search processing accept unit 301 divides the search job 1 into the internal memory search job 1 and the external memory search job 1.

In step S903, the search processing accept unit 301 enqueues the external memory search job 1 in the external search queue 303. In step S904, the search processing accept unit 301 enqueues the internal memory search job 1 in the internal search queue 302. In step S905, the external memory search job 1 queued in the external search queue 303 is dequeued by the search control unit 304. In step S906, the internal memory search job 1 queued in the internal search queue 302 is dequeued by the search control unit 304. In step S907, in order for execution of the internal memory search job 1, the search control unit 304 sets the search key and search mode acquired from the internal memory search job 1 in the internal memory search control unit 305, and issues a search processing request.

In step S908, in order for execution of the external memory search job 1, the search control unit 304 sets the search key and search mode acquired from the external memory search job 1 in the external memory search control unit 307, and issues a search processing request. In step S909, the internal memory search control unit 305 sequentially reads out entry data that is data targeted for searching stored in the internal memory table 306, and performs processing for comparing the read out entry data and the search key. Since the search mode is set to the all-search mode, the searching terminates when search processing for all the entry data pieces has been performed. In step S910, the external memory search control unit 307 sequentially reads out entry data that is data targeted for searching stored in the external memory table 308, and performs processing for comparing the read out entry data and the search key. Since the search mode is set to the all-search mode, the searching terminates when search processing for all the entry data pieces has been performed.

In step S911, the sub processor B 112 sets the search key, sets parameters such as the search mode (condition), and issues a search processing request, and thereafter the search processing accept unit 301 accepts the search processing and analyzes the search job 2. In step S912, the search processing accept unit 301 divides the search job 2 into the internal memory search job 2 and the external memory search job 2. In step S913, the search processing accept unit 301 enqueues the external memory search job 2 in the external search queue 303.

In step S914, the search processing accept unit 301 enqueues the internal memory search job 2 in the internal search queue 302. In step S915, the internal memory search job 2 is queued in the internal search queue 302. In step S916, the external memory search job 2 is queued in the external search queue 303. In step S917, the internal memory search job 1 terminates, and therefore the internal memory search control unit 305 notifies the internal memory search processing result to the search control unit 304. In step S918, the internal memory search job 1 terminates in the internal memory search control unit 305, and therefore the internal memory search job 2 queued in the internal search queue 302 is dequeued by the search control unit 304.

In step S919, in order for execution of the internal search job 2, the search control unit 304 sets the search key and search mode acquired from the internal memory search job 2 in the internal memory search control unit 305, and issues a search processing request.

In step S920, the internal memory search control unit 305 sequentially reads out entry data that is data targeted for searching stored in the internal memory table 306, and performs processing for comparing the read out entry data and the search key. Since the single-hit mode is set as the search mode, the comparison processing is terminated when a single entry data piece is found to match the search key.

In step S921, the internal memory search control unit 305 notifies the search processing result of the internal memory processing job 2 to the search control unit 304. The content of the notification is that the searching has terminated due to finding a hit, and also the address of the corresponding entry data piece. Upon receiving this notification, the search control unit 304 starts processing for terminating the search job 2 since the internal memory search job 2, in which the search mode is the single-hit mode, has terminated due to finding a hit.

In step S922, the search control unit 304 notifies the search result of the search job 2 to the search result notification unit 309. In step S923, since the search job 2 has terminated due to the termination of the internal memory search job 2, the search control unit 304 cancels the external memory search job 2 that is queued in the external search queue 303.

In step S924, the search result notification unit 309 notifies the termination of the search job 2 and the search result to the sub processor B 112 that issued the processing request in step S911. In step S925, since the external memory search job 1 has terminated, the external memory search control unit 307 notifies the search processing result of the external memory search job 1 to the search control unit 304. Upon receiving this notification, the search control unit 304 starts processing for terminating the search job 1 since the internal memory search job 1 and the external memory search job 1, into which the search job 1 was divided, have terminated.

In step S926, the search control unit 304 notifies the search result of the search job 1 to the search result notification unit 309. In step S927, the search result notification unit 309 notifies the termination of the search job 1 and the search result to the sub processor D 114 that issued the processing request in step S901. Although an example of processing which the internal memory search job terminates first is described in the present embodiment, in actuality it is the order in which processing terminates that determines the next job that is to be dequeued from the processing queues and begun to be processed. This completes the search job processing performed by the search apparatus 122 according to the sequence shown in FIG. 9.

According to the present embodiment, a search job is divided into an internal memory search job and an external memory search job, and the jobs are processed in parallel, thus enabling internal memory searching to be performed while external memory searching is being performed. This enables reducing the decrease in search processing performance in the case where a single search table is logically configured using an internal memory and an external memory. Furthermore, even while one of the memories is being searched in a search job that has been input, if the searching of the other memory has terminated, processing of the next search job can be started. Also, by designating the search mode, in the case of the single-hit mode, one job is immediately terminated or canceled from the queue if a hit is found in the other one of the divided search jobs, thus eliminating unnecessary processing of divided jobs. For this reason, in the case in which the search apparatus is shared among a plurality of processors, it is possible to partially shorten the delay time imposed on the processing of a job by another search job whose processing takes a longer time, and efficiently process consecutive search requests.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-169574, filed Jul. 17, 2009, and No. 2010-089856, filed Apr. 8, 2010, which are hereby incorporated by reference herein in their entirety.

What is claimed is:

1. An information processing apparatus comprising:
a first memory;
a second memory configured to operate at a higher speed than the first memory;
a search unit configured to perform search processing of data to be used for communication between the information processing apparatus and another apparatus from the first memory and the second memory, wherein the search processing by the search unit includes a first search method in which the search processing is terminated in a case where the data is detected in any one of the first memory and the second memory, and a second search method in which the search processing is continued even when the data is detected in any one of the first memory and the second memory; and
a control unit configured to move data from the first memory to the second memory in a case where the data is detected in the first memory by the search processing of the first search method, and configured not to move data from the first memory to the second memory in a case where the data is detected in the first memory by the search processing of the second search method.

2. The apparatus according to claim 1, wherein the control unit changes a storing position of data within the second memory in a case where the data is detected in the second memory by the search processing of the first search method.

3. The apparatus according to claim 2, wherein the control unit changes the storing position of the data within the second memory to a storing position where a search is performed at first in the second memory.

4. The apparatus according to claim 1, wherein the search unit performs a search processing of data used for a TCP/IP compliant communication with the another apparatus.

5. An information processing method executed by an information processing apparatus comprising a first memory, and a second memory configured to operate at a higher speed than the first memory, the method comprising:
a search step of performing search processing of data to be used for communication between the information processing apparatus and another apparatus from the first memory and the second memory, wherein the search processing in the search step includes a first search method in which the search processing is terminated in a case where the data is detected in any one of the first memory and the second memory, and a second search method in which the search processing is continued even when the data is detected in any one of the first memory and the second memory; and
a control step of moving data from the first memory to the second memory in a case where the data is detected in the first memory by the search processing of the first search method, and not moving data from the first memory to the second memory in a case where the data is detected in the first memory by the search processing of the second search method.

6. A non-transitory computer-readable storage medium storing computer executable code of a computer program for causing a computer to execute each step of the information processing method according to claim 5.

* * * * *